United States Patent
Ishikawa et al.

(10) Patent No.: US 10,989,794 B2
(45) Date of Patent: Apr. 27, 2021

(54) SCANNING OPTICAL SYSTEM AND RADAR

(71) Applicant: KONICA MINOLTA, INC., Chiyoda-ku (JP)

(72) Inventors: Ryouta Ishikawa, Chiyoda-ku (JP); Hiroyuki Matsuda, Chiyoda-ku (JP); Masashi Kageyama, Chiyoda-ku (JP); Junichiro Yonetake, Chiyoda-ku (JP); Hideyuki Fujii, Chiyoda-ku (JP); Hiroyuki Shindo, Chiyoda-ku (JP)

(73) Assignee: Konica Minolta, Inc., Tokyo (JP)

( * ) Notice: Subject to any disclaimer, the term of this patent is extended or adjusted under 35 U.S.C. 154(b) by 308 days.

(21) Appl. No.: 16/106,924

(22) Filed: Aug. 21, 2018

(65) Prior Publication Data
US 2019/0056481 A1 Feb. 21, 2019

Related U.S. Application Data

(63) Continuation of application No. 14/782,505, filed as application No. PCT/JP2014/060167 on Apr. 8, 2014, now Pat. No. 10,078,132.

(30) Foreign Application Priority Data

Apr. 11, 2013 (JP) .................................. 2013-082609

(51) Int. Cl.
*G01S 7/48* (2006.01)
*G01S 7/481* (2006.01)
(Continued)

(52) U.S. Cl.
CPC ............ *G01S 7/4817* (2013.01); *G01S 17/42* (2013.01); *G01S 17/931* (2020.01); *G02B 26/129* (2013.01)

(58) Field of Classification Search
CPC ........ G02B 26/12; G02B 5/09; G02B 26/129; G01S 17/42; G01S 7/4817; G01S 17/931
See application file for complete search history.

(56) References Cited

U.S. PATENT DOCUMENTS

| | | |
|---|---|---|
| 4,084,092 A | 4/1978 | Runciman |
| 4,458,982 A | 7/1984 | Blain et al. |
| | (Continued) | |

FOREIGN PATENT DOCUMENTS

| | | |
|---|---|---|
| EP | 0423812 | 4/1991 |
| JP | 154248/1977 | 11/1977 |
| | (Continued) | |

OTHER PUBLICATIONS

Search Report dated Nov. 3, 2016 which issued in the corresponding European Patent Application No. 14782429.6.

*Primary Examiner* — Luke D Ratcliffe
(74) *Attorney, Agent, or Firm* — Cozen O'Connor

(57) ABSTRACT

Scanning optical system, comprising a rotatable mirror unit including first and second mirror surfaces each inclining relative to a rotation axis, and a light projecting system including a light source which emits light flux toward an object through the mirror unit. The light flux is reflected on the first mirror surface, then to the second mirror surface, and projected so as to scan on the object correspondingly to rotation of the mirror unit. The mirror unit includes multiples pairs of the first and second mirror surfaces, and the respective intersection angles of the multiples pairs are different from each other. In one rotation of the mirror unit, light flux emitted from the light source is reflected on the second mirror surfaces, and is projected sequentially, thereby to scan a measurement range in which the object is measured. Length in a sub scanning direction of the light flux and intersection angles of the multiples pairs correspond (Continued)

to length in a sub scanning direction of the measurement range.

10 Claims, 19 Drawing Sheets

(51) Int. Cl.
  *G01S 17/42* (2006.01)
  *G02B 26/12* (2006.01)
  *G01S 17/931* (2020.01)

(56) References Cited

U.S. PATENT DOCUMENTS

| | | | |
|---|---|---|---|
| 4,757,200 A | | 7/1988 | Shepherd |
| 5,000,529 A | * | 3/1991 | Katoh ................ G02B 5/09 |
| | | | 235/462.39 |
| 5,187,606 A | | 2/1993 | Kondo |
| 5,268,565 A | * | 12/1993 | Katoh ................ G02B 5/09 |
| | | | 235/462.31 |
| 8,678,285 B2 | * | 3/2014 | Kearney ............ G06K 7/10613 |
| | | | 235/462.01 |
| 2004/0182933 A1 | * | 9/2004 | Tien ................ G06K 7/10702 |
| | | | 235/462.41 |
| 2011/0235019 A1 | | 9/2011 | Matsubara et al. |

FOREIGN PATENT DOCUMENTS

| | | |
|---|---|---|
| JP | 2010-217782 | 9/2010 |
| JP | 2011-197575 | 10/2011 |

* cited by examiner

SCANNING OPTICAL SYSTEM AND RADAR

This application is a continuation of U.S. patent application Ser. No. 14/782,505 filed Oct. 5, 2015, which is a U.S. National Stage of International Application No. PCT/JP2014/060167 filed Apr. 8, 2014, which claims priority of Japanese application no. 2013-082609 filed Apr. 11, 2013, the entire content of all of which are hereby incorporated by reference.

TECHNICAL FIELD

The present invention relates to a scanning optical system suitably usable for a radar to detect an object by irradiating a laser beam and to a radar.

BACKGROUND ART

In recent years, in the field of cars, security robots, etc., a request to perform obstacle detection in a moving direction with sufficient precision for the purpose of collision prevention has increased. As a method of obstacle detection, a laser radar being a distance measuring device using light beam scanning has been known. A common laser radar is a device which measures a distance to an obstacle based on time after having projected a laser beam until receiving reflected light rays.

In the case of projecting a light flux without narrowing it, an amount of light rays which collide against an object becomes smaller, which is not suitable for measurement on a long distance. Accordingly, scanning is performed with a narrowed light flux, whereby enlargement of a detection range can be attained. As a general scanning technique, a technique to rotate or oscillate a mirror or a polygon mirror with multiple mirror surfaces has been known.

In particular, since a laser radar needs to detect a wide range, the laser radar is required to project a laser light flux to a wide range. Although a light projecting range in a scanning angle direction is determined based on a scanning angle and a spot size, since the scanning angle direction of a laser light flux becomes the rotation direction of a mirror, it is not necessary for the spot size to be made larger in the scanning angle direction. Further, in order to increase resolving power, it is preferable to make a spot size shorter in the scanning angle direction. On the other hand, a light projecting range of a sub scanning angle direction orthogonal to a scanning angle direction is determined based on the number of scanning lines and a projected light spot size (or a view field of a light receiving lens). Since there is a limitation in increasing the number of scanning lines, a projected light spot size at the center of a scanning angle has to be made longer in a sub scanning angle direction. Therefore, in many cases, a spot size in a horizontal direction is different from a spot size in a vertical direction.

Furthermore, in order to perform highly precise detection, a skill is required for suppressing a change in resolving power for measurement between the center of scanning and a periphery of the scanning. As a factor to cause a change in resolving power, there are longitudinal distortion and spot rotation. Description is given to them. In FIG. 1 showing schematically a laser radar, it is assumed that a mirror unit MU includes a reflecting surface RM1 inclining relative to a rotation axis RO and the mirror unit MU is rotated around the rotation axis RO. Herein, it is further assumed that a spot light flux SL emitted from a light source LD of a light projecting system LP in a direction along the rotation axis RO has an aspect ratio other than 1.0. Accordingly, in FIG. 1, a spot light flux SL (its cross section is indicated with hatching) reflected on a reflecting surface RM1 in a measurement range proceeds in a direction perpendicular to the sheet surface of FIG. 1. At this time, its cross section is shaped in a rectangular cross section in which a length "a" in a scanning angle direction (a lateral direction in the drawing) is smaller than a length "b" (>a) in a sub scanning angle direction (a vertical direction in the drawing).

On the other hand, as shown in FIG. 2, in the case where the mirror unit MU rotates by about 30 degrees, a light flux LB reflected on a reflecting surface RM1 moves from a position shown in FIG. 1 to a lateral direction. With this movement, although scanning is performed for a range where an object exists, spot rotation arises in the spot light flux SL. Further, in the case where a light flux LB enters the reflecting surface RM in a direction not parallel to the rotation axis, longitudinal distortion also arises (spot rotation differs from the case of parallel incidence). In concrete terms, in longitudinal distortion, a spot light flux SL distorts in a sub scanning angle direction. Accordingly, an interval between scanning lines becomes narrower, or an interval becomes wider. In FIG. 2, it means a phenomenon that a spot light flux SL shifts from an originally-proceeding direction (a solid line) to an axis line direction of the rotation axis RO (illustrated with a broken line). An amount of this shift is represented by an angle deviation ($\varepsilon$) in a sub scanning angle direction. On the other hand, in the case where there is a difference between the scanning angle direction and the sub scanning angle direction in a cross sectional shape of a spot light flux SL, an interval between spot light fluxes becomes narrower, or an interval becomes wider by the rotation of a spot light flux. In FIG. 2, it means a phenomenon that a spot light flux SL rotates as shown with a one-dot chain line relative to an original attitude direction (a solid line). Its rotation angle $\gamma$ is called spot rotation angle.

FIG. 3 is a diagram showing a relationship between a scanning angle and a spot rotation angle in the case where a light flux is made to enter a reflecting surface inclining by 45 degrees relative to the rotation axis in a direction parallel to a rotation axis. Here, in the case where a light flux is made to enter a reflective surface RM in a direction parallel to a rotation axis, a scanning angle become the same with a rotation angle. As shown in FIG. 3, as a rotation angle $\alpha$ of a reflecting surface RM1 increases, a spot rotation angle $\gamma$ increases.

CITATION LIST

Patent Literature

PTL1: Japanese Unexamined Patent Publication No. 2011-197575

SUMMARY OF INVENTION

Technical Problem

PTL1 discloses a technique to correct longitudinal distortion shown in FIG. 4A in a wide scanning range shown in FIG. 4B by inclining the rotation axis of a reflecting surface. However, consideration has not been given to the rotation of a spot light flux. Further, there is a problem that arrangement relative to a rotation axis is difficult.

The present invention has been made in view of the above-mentioned circumstances, and an object of the present invention is to provide a scanning optical system which can suppress longitudinal distortion and spot rotation in a spot light flux irradiated to an object and can suppress a change in resolving power while having a wide view field range, and to provide a radar.

Solution to Problem

A scanning optical system according to the present invention, includes:

a rotatable mirror unit including a first mirror surface inclining relative to a rotation axis and a second mirror surface; and a light projecting system including at least one light source which emits a light flux toward an object through the mirror unit;

wherein a light flux emitted from the light source is reflected on the first mirror surface of the mirror unit, then, proceeds to the second mirror surface, further reflected on the second mirror surface, and projected so as to scan on the object correspondingly to rotation of the mirror unit, and wherein the light flux emitted from the light projecting system is made longer in a sub scanning angle direction than in a scanning angle direction in a measurement range of the object and satisfies the following conditional expression, $$|\theta 1 - 90| \times |\alpha| \leq 225 \quad (1)$$

in the expression, θ1 is an intersection angle (°) between the first mirror surface and the second mirror surface, and α is a rotation angle (°).

Japanese Unexamined Patent Publication No. S50-109737 discloses a constitution that a first mirror surface and a second mirror surface are formed with a nipping angle of 90 degrees on a rotatable mirror unit, a light flux emitted from a light source along a direction orthogonal to a rotation axis is reflected twice on a first mirror surface and a second mirror surface so as to scan, whereby even if the rotation axis is made to incline by rotation deflection, the scanning line is prevented from disturbing. In the case of considering so as to apply such a mirror constitution to a radar, in a general scanning-type radar, scanning is performed for a measurement range by using a vertically-long spot light flux. Accordingly, it turns out that there are problems described below.

Herein, it is assumed in the following description that the rotation axis of a mirror unit does not incline, a direction orthogonal to the rotation axis is a scanning angle direction, and a direction parallel to the rotation axis is a sub scanning angle direction. Further, it is assumed that a scanning angle center is made by reversely rotating an angle, in a scanning direction, of an optical axis of a light projecting system immediately before colliding with the first mirror by 180 degrees. Further, it is assumed that an angle in the sub scanning angle direction relative to the scanning angle direction is made to a sub scanning angle, and a sub scanning angle center is made to an angle orthogonal to the rotation axis. Herein, "longitudinal distortion" means an angle deviation in the sub scanning angle direction relative to an angle, in the sub scanning angle direction, of the scanning angle center when scanning is performed on a periphery. Further, "spot rotation angle" means an angle at which a light projecting direction is rotated around the center on the basis of a spot at the scanning angle center.

For example, as shown in FIG. 5, the optical axis SO of a light projecting system LPS which includes a light source LD and a collimating lens CL is arranged so as to be orthogonal to the rotation axis RO of the mirror unit MU which includes the first mirror surface M1 and the second mirror surface M2. At this time, on the basis of an apex of an intersection angle formed by the first mirror surface M1 and the second mirror surface M2, the light projecting system LPS is arranged on the first mirror surface M1 side. Here, the first mirror surface M1 is arranged to incline by −45 degrees from a flat plane orthogonal to the rotation axis RO relative to the optical axis direction of the light projecting system LPS, and the second mirror surface M2 is arranged to incline by +45 degrees from a flat plane orthogonal to the rotation axis relative in the optical axis direction of the light projecting system LPS.

As shown in FIG. 6, when the rotation position of the mirror unit MU becomes an angle where the optical axis SO of the light projecting system LPS is positioned in a plane which includes the respective normal lines of the first mirror surface M1 and the second mirror surface M2 (in a state where the optical axis SO faces the scanning angle center), a light flux LB emitted from the light projecting system LPS is reflected on the first mirror surface M1, proceeds in parallel to the rotation axis RO, and then, is reflected on the second mirror surface M2. Successively, the reflected light flux LB is projected from the second mirror M2 to an object. At this time, as shown in FIG. 6(*a*), in the case where the mirror unit MU is viewed from the light projecting direction, the optical axis SO of the light projecting system LPS may be shifted rightward or leftward from the rotation axis RO.

Furthermore, as shown in FIG. 7, in the case where the mirror unit MU is rotated from the scanning angle center (in a state shown in FIG. 6) by an rotation angle α=45 degrees around the rotation axis RO, as a relative angle difference between a light flux LB after having been reflected on the second mirror surface M2 and a light flux LB immediately after having been emitted from the light projecting system, a scanning angle (as shown in FIG. 7(*b*), when viewing from the rotation axis RO, an angle formed by the optical axis SO of the light projecting system LPS and a light flux LB emitted from the mirror unit MU) becomes 90 degrees. That is, it turns out that a scanning angle (δ=90 degrees) larger than two times a rotation angle (α=45 degrees) can be obtained.

FIG. 8 shows a relationship of longitudinal distortion (shown with a sub scanning angle) relative to a scanning angle δ in this case, and FIG. 9 shows a relationship of a spot rotation angle relative to the scanning angle δ. Like this, in the case where an angle formed by the first mirror surface M1 and the second mirror surface M2 is 90 degrees, even if the scanning angle δ changes, neither longitudinal distortion nor spot rotation angle changes. Therefore, by projecting a spot light flux with a vertically-long cross section to an object, scanning can be performed ideally.

However, in the case of using such a constitution in a radar, a measurement range may not be a sub scanning angle 0°, or an incident angle may not coincide with a sub scanning angle. Further, since a length, in the sub scanning direction, of a cross section of a spot light flux is limited, there is a circumstance that a measurement range where an object exists is required to be divided in the sub scanning angle direction. Accordingly, it is required to dispose multiple pairs of first mirror surfaces and second mirror surfaces in a mirror unit, and to shift an angle formed by the first mirror surface and the second mirror surface of each of the multiple pairs from 90 degrees so as to shift each of the respective light fluxes passing on the multiple mirror pairs in the sub scanning angle direction such that the respective light fluxes can scan on the respective different sub scanning angle direction positions. However, in the case where an angle formed by the first mirror surface and the second mirror surface is shifted from 90 degrees, there is a problem that each of longitudinal distortion and spot rotation increases.

Then, the present inventors have examined a permissible range of each of longitudinal distortion and spot rotation. FIG. 10 shows a relationship between a scanning angle and longitudinal distortion at the time of changing an inclination angle of the first mirror surface M1. FIG. 11 shows a relationship between a scanning angle and spot rotation at the time of changing an inclination angle of the first mirror surface M1. In the case where, on a condition shown in FIG. 5, the first mirror surface M1 is made to incline from a flat plane orthogonal to the rotation axis RO of the second mirror surface M2 in the optical axis direction of the light projecting system by 45 degrees, 46 degrees, and 47 degrees, longitudinal distortion and spot rotation are as being shown in FIGS. 10 and 11, respectively. In the case where an angle formed by the first mirror surface and the second mirror surface changes, since the degree of a change of each of longitudinal distortion and spot rotation changes, it turns out that an angle of the first mirror surface and an angle of the second mirror surface may be set freely. Further, it is not necessary to rotate at a constant speed like a laser printer. In the case where it is intended to project a light flux in a certain specific direction, it may be permissible to stop after being rotated by a necessary angle or to oscillate in a reciprocating motion.

Further, in view of the actual circumstances of a radar, in consideration of the matter that projected spot light fluxes may overlap with each other or an interval between projected spot light fluxes may become wider, it has turned out that it is desired to make spot rotation within 15° from the scanning angle center, preferably within 10°. Also, it has turned out that it is desired to make longitudinal distortion within ⅛ relative to the scanning angle, preferably within 1/10.

Based on the above knowledge, the present inventors have examined a condition to suppress longitudinal distortion and spot rotation in a range where there is actually no problem. As a result, the following conditional expression (1) was obtained, $$|\theta 1-90|\times|\alpha|\leq 225 \quad (1)$$

in the expression, θ1 is an intersection angle (°) between the first mirror surface and the second mirror surface, and a is a rotation angle (°).

The conditional expression (1) is a conditional expression to suppress spot rotation and longitudinal distortion in a range of a scanning angle of ±90 degrees and a sub scanning angle of ±30 degrees. In the case of being within a range of the conditional expression (1), spot rotation and longitudinal distortion can be suppressed within a range where there is actually no problem. However, interpretation should not be limited to the above range. It is preferable to satisfy the following expression.

$$|\theta 1-90|\times|\alpha|\leq 180 \quad (1')$$

It is more preferable to satisfy the following expression.

$$|\theta 1-90|\times|\alpha|\leq 120 \quad (1'')$$

A radar according to the present invention is characterized by including the above-mentioned scanning optical system.

As a light source of the radar, LED configured to emit pulsed light fluxes or laser may be used, whereby distance measurement can be performed in TOF (Time of flight). As compared with a scanning optical system used for a radar using the conventional TOF, since a change in resolving power is little with a wide scanning angle, it is possible to provide a radar which has a wide view field angle and is usable effectively.

Advantageous Effects of Invention

According to the present invention, it is possible to provide a scanning optical system which can suppress longitudinal distortion and spot rotation in a spot light flux irradiated to an object and can suppress a change in a resolving power while having a wide view field range, and to provide a radar.

DESCRIPTION OF EMBODIMENTS

Figure 16:
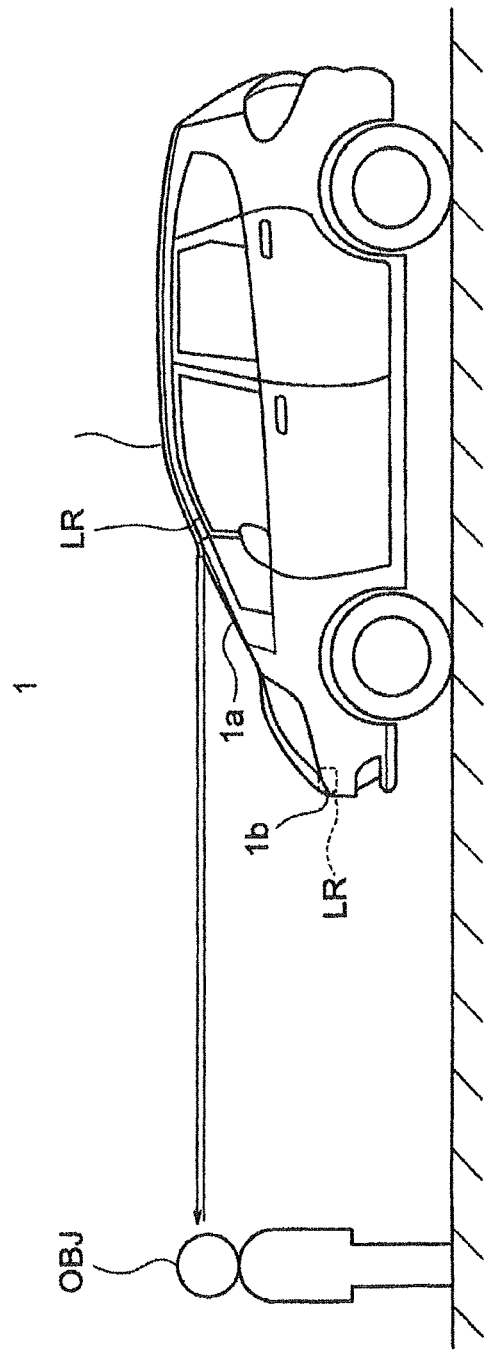
FIG. 16 is an outline drawing showing a state where a laser radar according to a present embodiment is mounted on a vehicle.

Hereinafter, an embodiment of the present invention will be described with reference to the attached drawings. FIG. 16 is a schematic drawing showing a state where a laser radar according to the present embodiment is mounted on a vehicle. A laser radar LR of the present embodiment is disposed at the back of a front window 1a of the vehicle 1 or the back of a front grille 1b.

Figure 17:
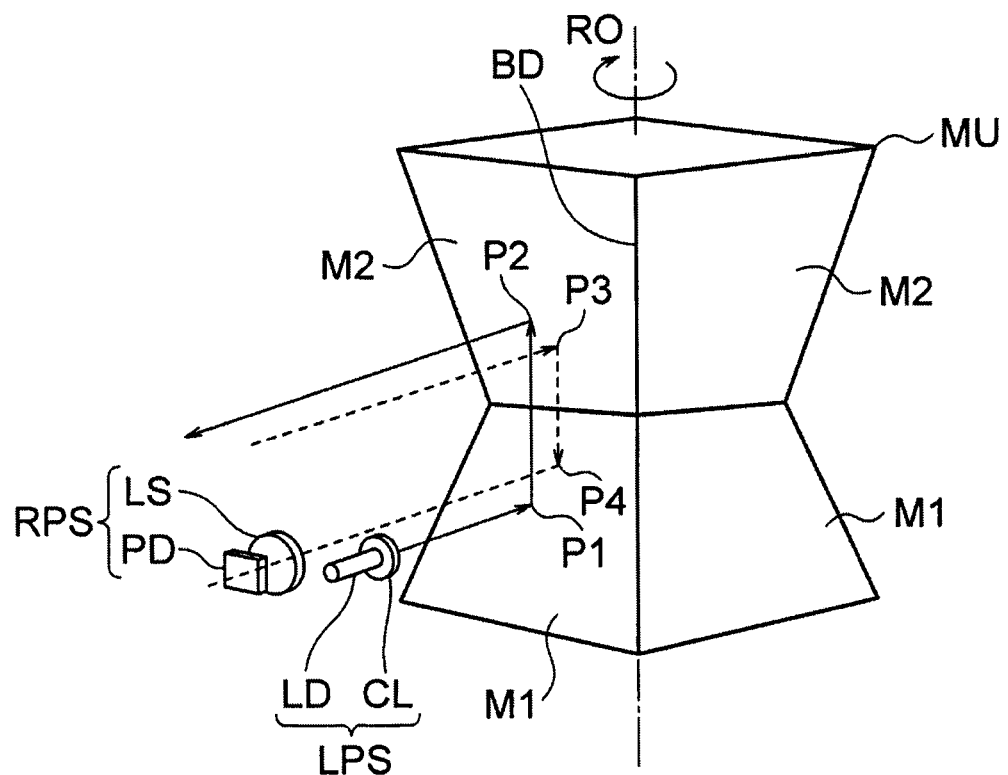
FIG. 17 is an outline drawing showing a laser radar according to a present embodiment.

FIG. 17 is an outline constitution drawing of the laser radar LR according to the present embodiment and is a view looked from the horizontal direction. The configuration, length, etc. of each of constitution components may differ from actual sizes. The laser radar LR includes, for example, a pulse type semiconductor laser LD configured to emit a laser light flux; a collimating lens CL configured to convert a divergent light flux from the semiconductor laser LD to a parallel light flux; a mirror unit MU configured to project the laser light flux collimated by the collimating lens CL from rotating reflecting surfaces toward an object OBJ side (FIG. 16) so as to scan on the object OBJ and to reflect light rays reflected from the object OBJ scanned with the projected light flux; a lens LS configured to collect the reflected light rays reflected on the mirror unit MU from the object OBJ; and a photodiode PD configured to receive the light rays collected by the lens LS.

Figure 1:
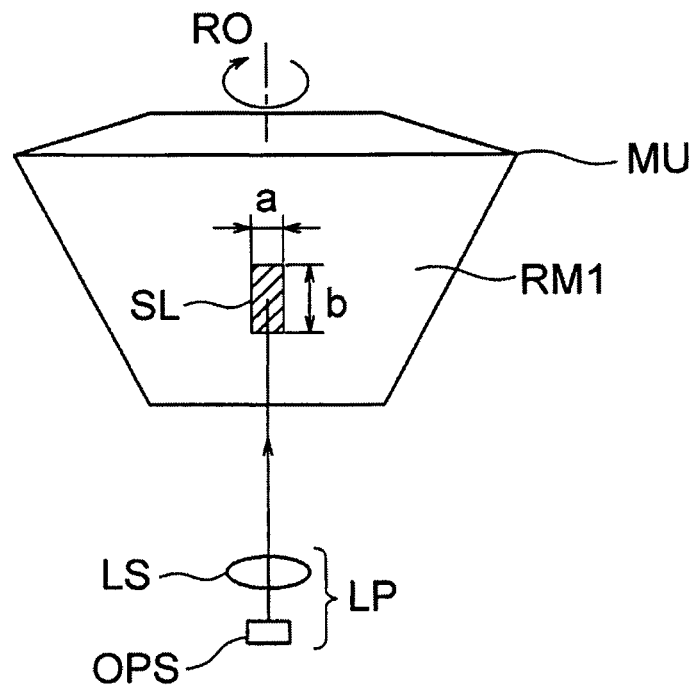
FIG. 1 is a drawing showing a radar of a comparative example.
Figure 2:
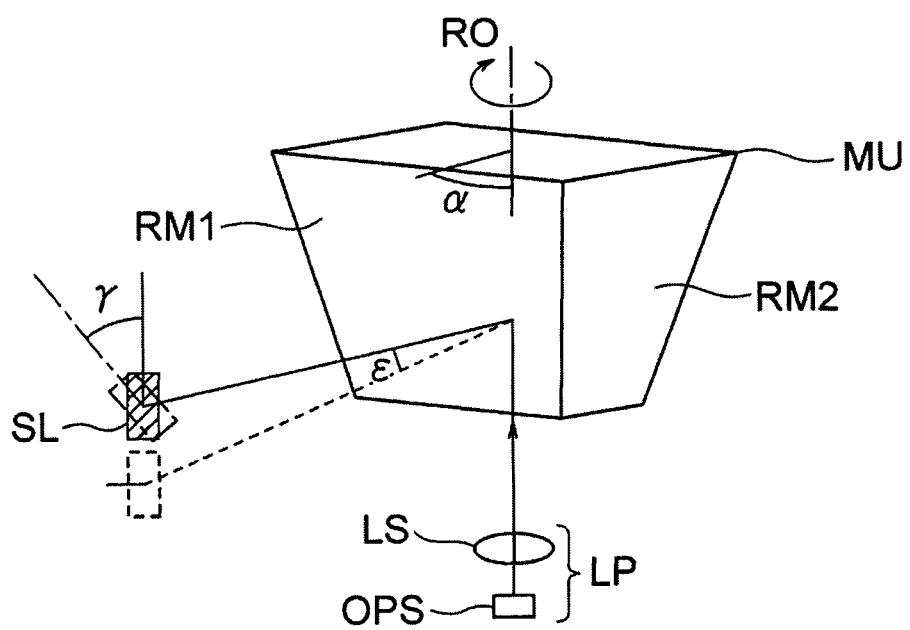
FIG. 2 is a drawing showing a radar of a comparative example.
Figure 3:
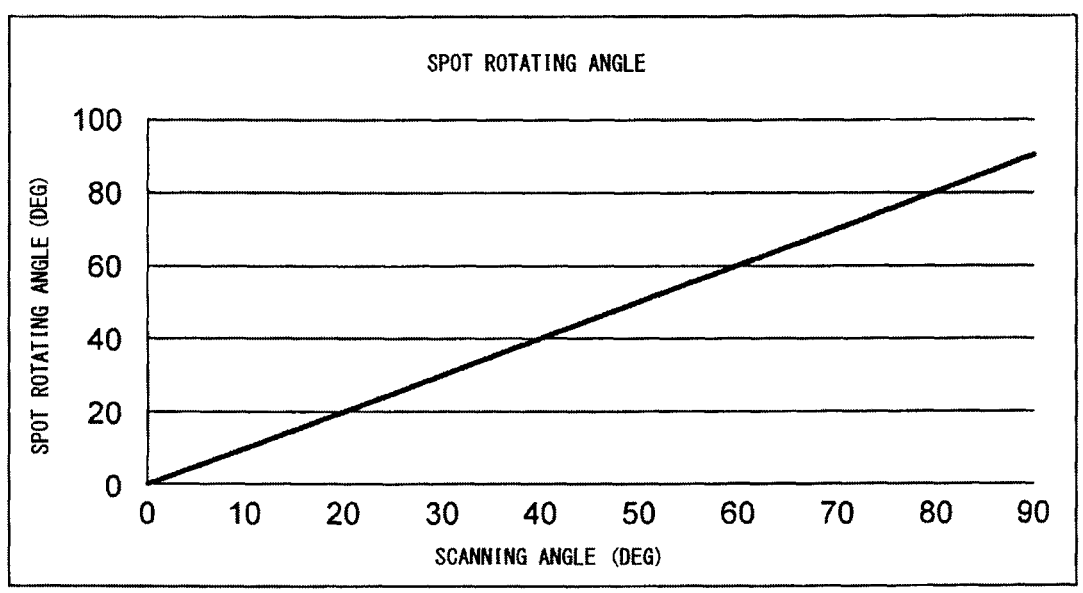
FIG. 3 is a diagram showing a relationship between a scanning angle and a spot rotation angle in a radar of a comparative example.
Figure 4A:
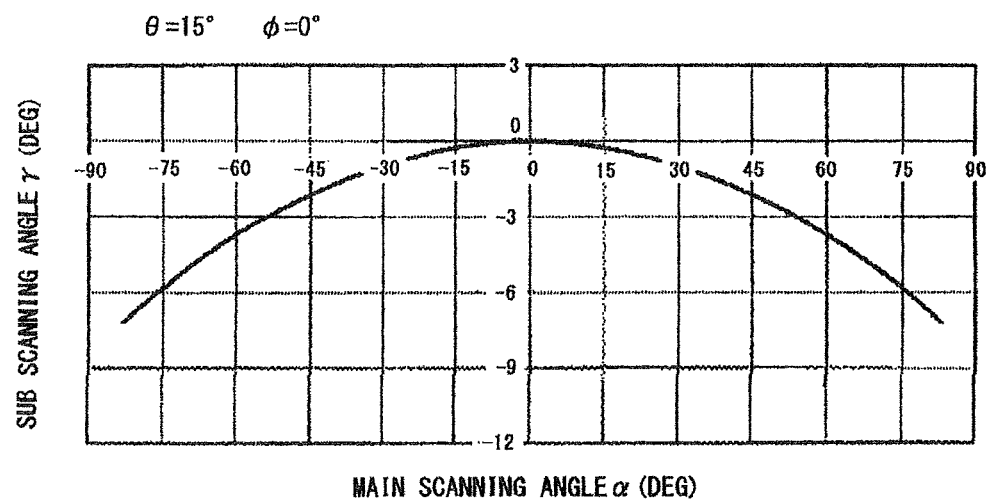
FIG. 4A is a diagram showing longitudinal distortion before correction according to a conventional technique.
Figure 4B:
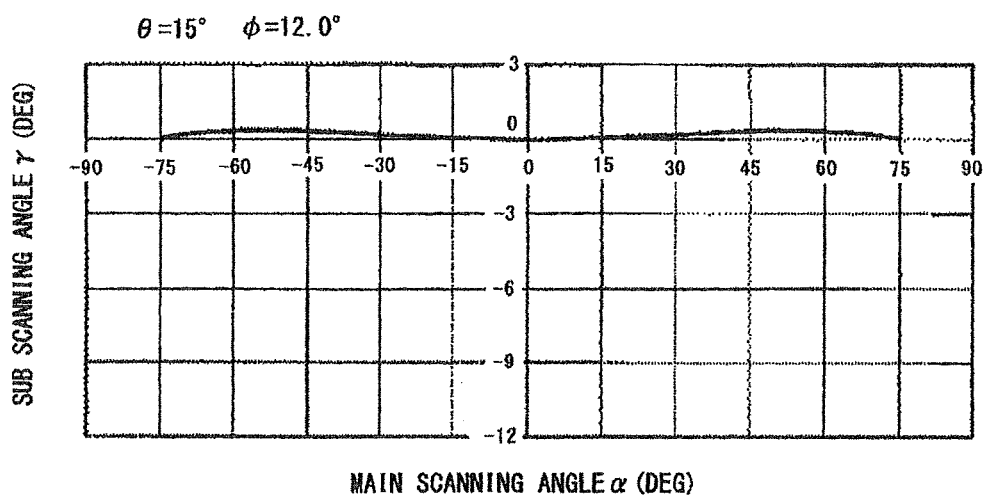
FIG. 4B is a diagram showing longitudinal distortion after correction according to a conventional technique.
Figure 5:
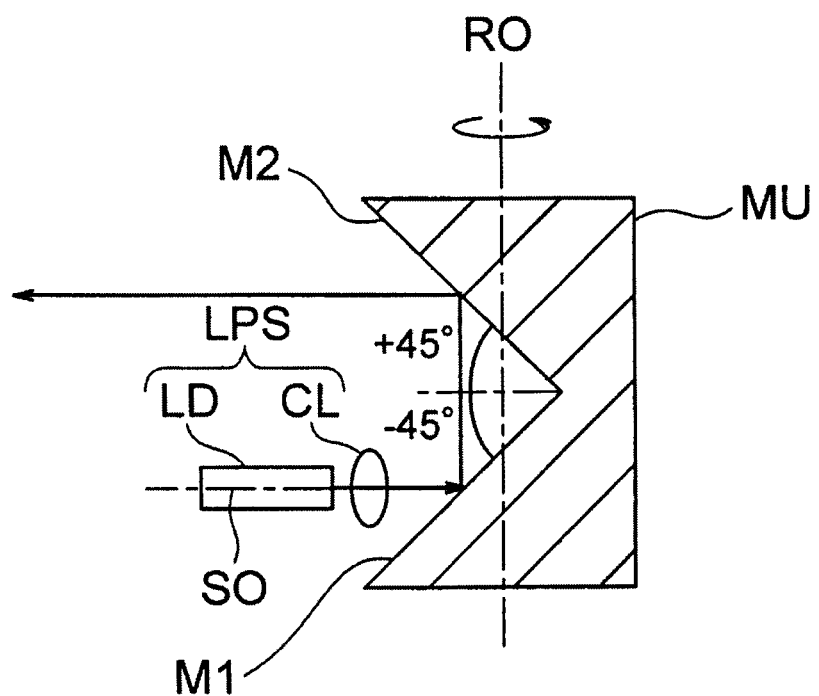
FIG. 5 is a drawing showing a radar according to an example of the present invention by cutting it at a plane including a rotation axis.
Figure 6A:
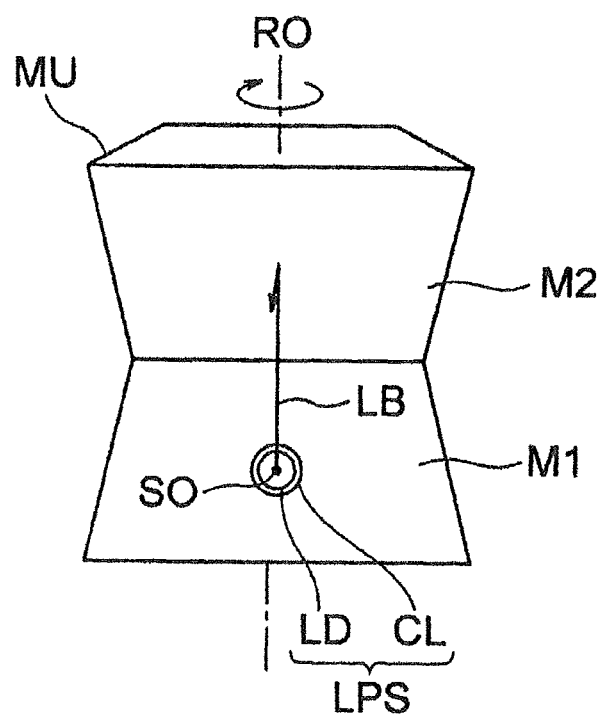
FIG. 6A is a front view of a radar according to an example of the present invention.
Figure 6B:
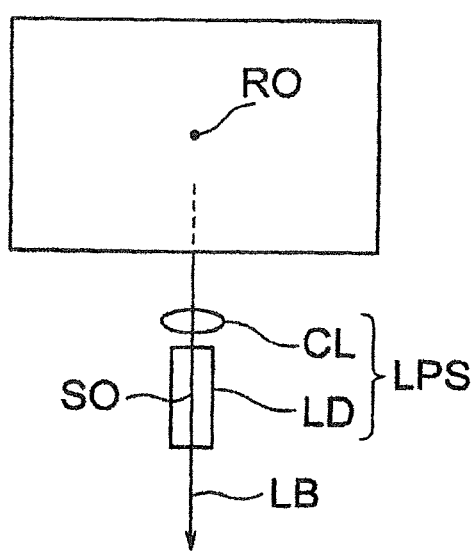
FIG. 6B is a drawing prepared to look a rotation axis direction and shows a state of the center of a scanning angle.
Figure 7A:
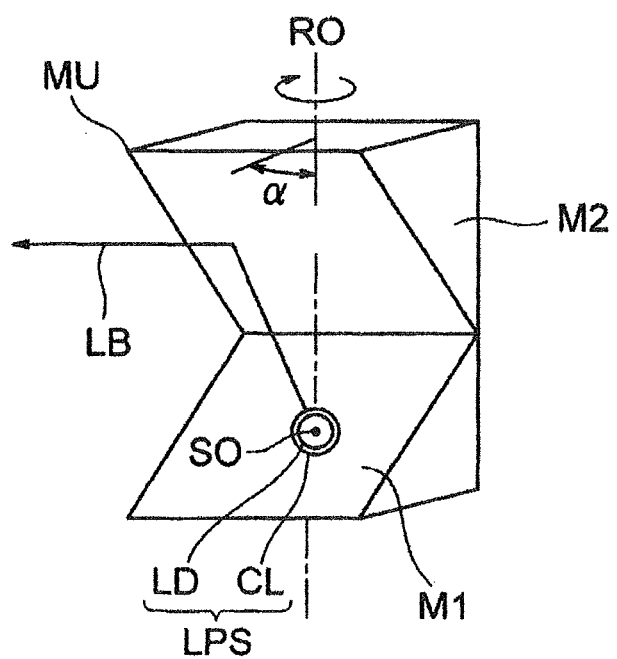
FIG. 7A is a front view of a radar according to an example of the present invention.
Figure 7B:
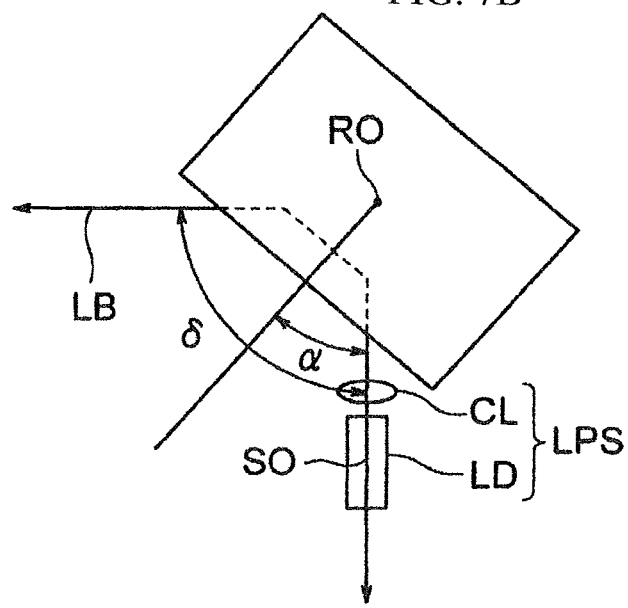
FIG. 7B is a drawing prepared to look a rotation axis direction and shows a state of a periphery of a scanning angle.
Figure 8:
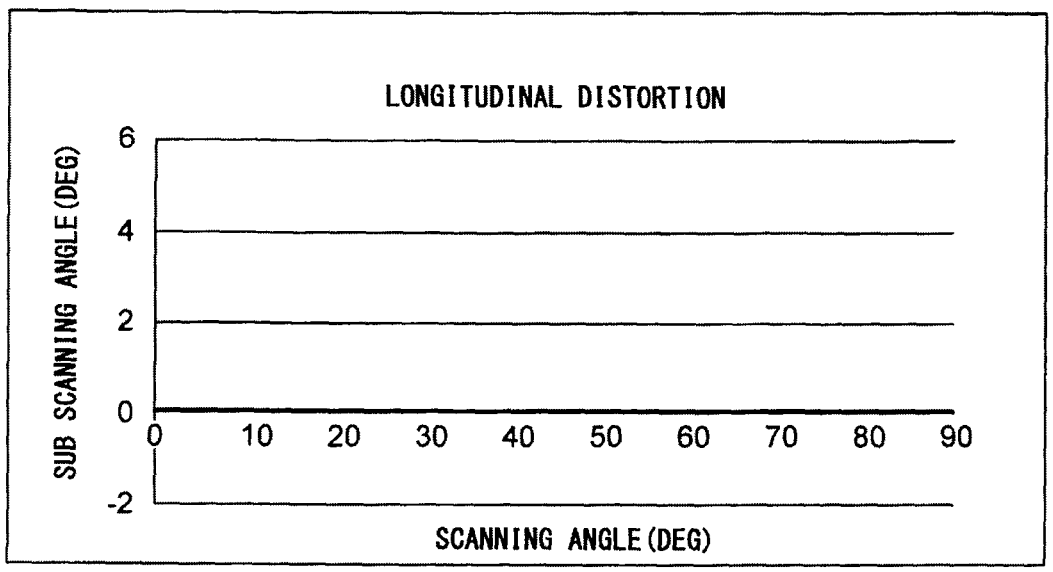
FIG. 8 is a diagram showing a relationship between a scanning angle and longitudinal distortion in a radar of an ideal state.
Figure 9:
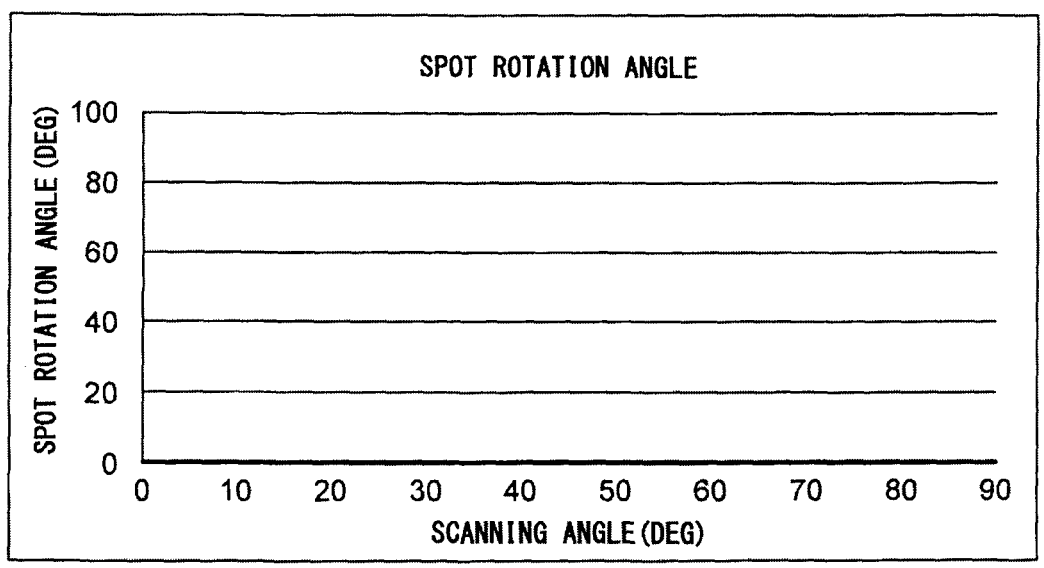
FIG. 9 is a diagram showing a relationship between a scanning angle and a spot rotation angle in a radar of an ideal state.
Figure 10:
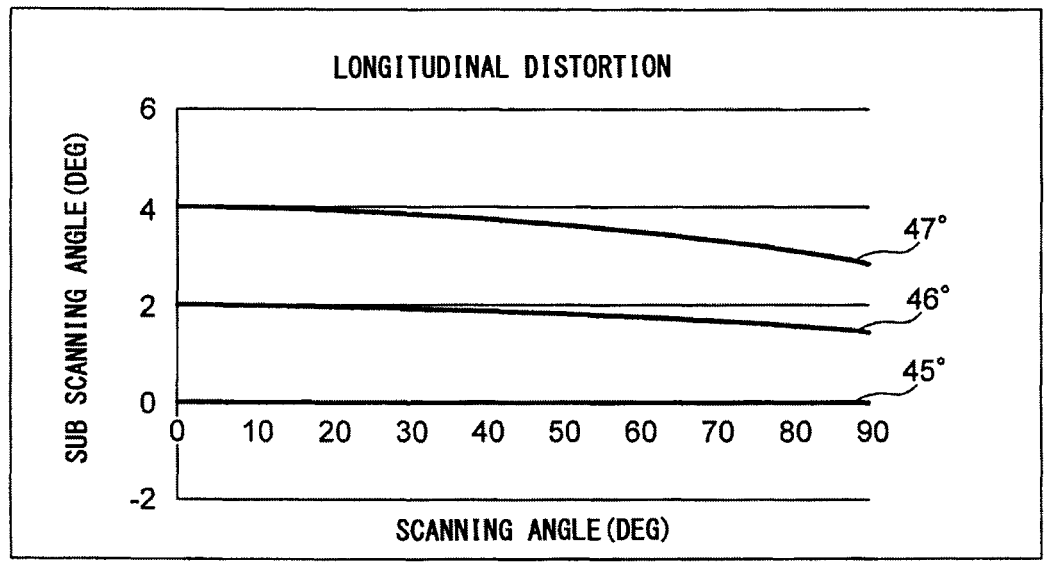
FIG. 10 is a diagram showing a relationship between a scanning angle and longitudinal distortion in a radar according to an example of the present invention.

A light projecting system LPS is constituted by the semiconductor laser LD and the collimating lens CL, and a light receiving system RPS is constituted by the lens LS and the photodiode PD. The light flux emitted from the light projecting system LPS is made longer in a sub scanning angle direction (vertical scanning angle direction) rather than in a scanning angle direction in a measuring range of the subject (refer to FIG. 1(a)).

The mirror unit MU shaped in an almost square cylinder is held so as to be rotatable around a rotation axis RO being an axis line. Four first mirror surfaces M1 each shaped in a trapezoid are disposed on a lower outer periphery of the mirror unit MU, and four second mirror surfaces M2 each shaped in a trapezoid are disposed on an upper outer periphery such that each of the four second mirror surfaces M2 faces a corresponding one of the four first mirror surfaces M1. An intersection angle between a first mirror surface M1 and a second mirror surface M2 which form a pair in a vertical direction is made different. Further, the following conditional expression is satisfied.

$$|\theta1-90|\times|\alpha|\leq 225 \tag{1}$$

In the expression, $\theta1$ is an intersection angle (°) between the first mirror surface M1 and the second mirror surface M2, and $\alpha$ is a rotation angle (°).

The optical axis of each of the light projecting system LPS and the light receiving system RPS is made orthogonal to the rotation axis RO of the mirror unit MU, and the light projecting system LPS is arranged more far in the rotation axis RO direction rather than the light receiving system RPS.

Next, the distance measuring operation of the laser radar LR is described. A divergent light flux emitted intermittently in a pulse form from the semiconductor laser LD is converted into a parallel light flux by the collimating lens CL, enters a point P1 on the first mirror surface M1 of the rotating mirror unit MU, then, is reflected on the point P1, proceeds toward the second mirror surface M2, further, is reflected on a point P2 on the second mirror surface M2, and is projected so as to scan on the object OBJ side.

Figure 18:
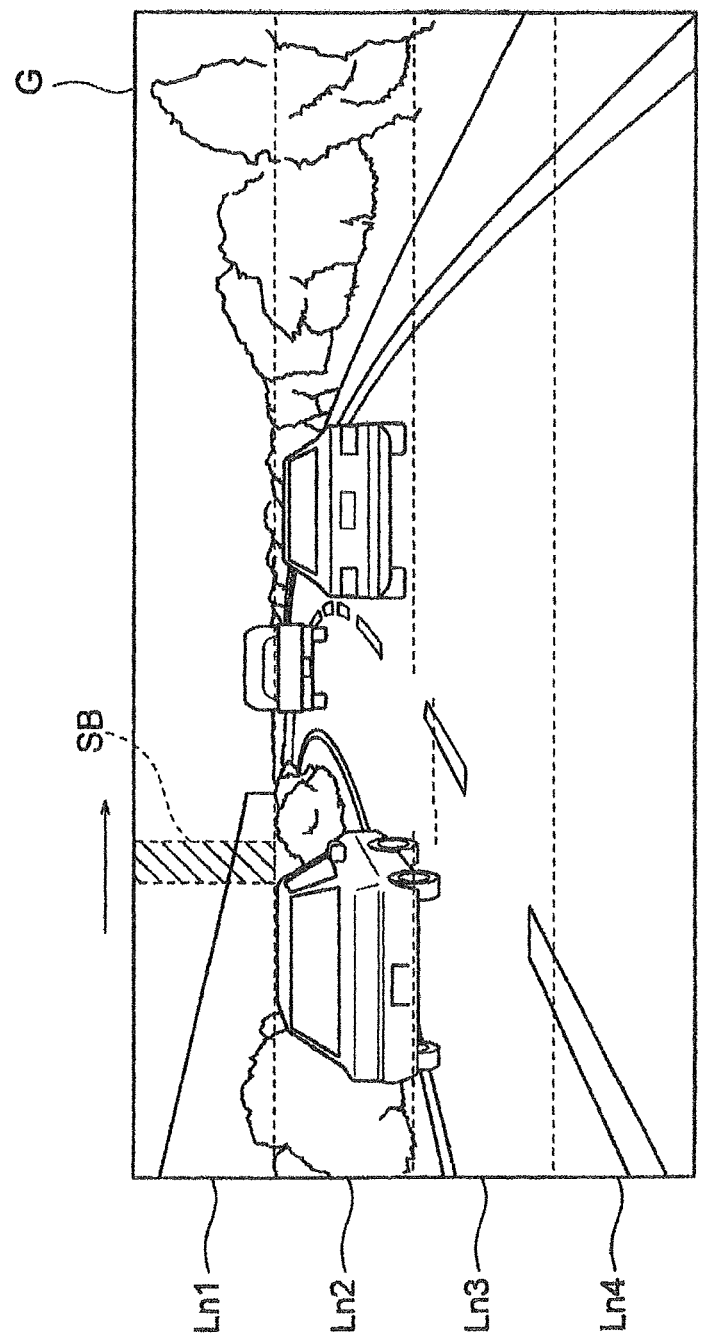
FIG. 18 is a drawing showing a screen corresponding to an object region scanned with a laser radar LR.

FIG. 18 is an illustration showing a state where an emitted laser spot light flux SB (indicated with hatching) scans on a screen G being a detection range of the laser radar LR in accordance with rotation of the mirror unit MU. An intersection angle becomes different depending on a combination of the first mirror surface M1 and the second mirror surface M2 in the mirror unit MU. A laser light flux is reflected sequentially on the rotating first mirror surface M1 and second mirror surface M2. First, a laser light flux reflected on the first mirror surface M1 and second mirror surface M2 of the first pair scans from the left to the right in the horizontal direction on a region Ln1 located at the uppermost position on the screen G correspondingly to the rotation of the mirror unit MU. Next, a laser light flux reflected on the first mirror surface M1 and second mirror surface M2 of the second pair scans from the left to the right in the horizontal direction on a region Ln2 located at the second position from the top on the screen G correspondingly to the rotation of the mirror unit MU. Next, a laser light flux reflected on the first mirror surface M1 and second mirror surface M2 of the third pair scans from the left to the right in the horizontal direction on a region Ln3 located at the third position from the top on the screen G correspondingly to the rotation of the mirror unit MU. Next, a laser light flux reflected on the first mirror surface M1 and second mirror surface M2 of the fourth pair scans from the left to the right in the horizontal direction on a region Ln4 located at the lowermost position on the screen G correspondingly to the rotation of the mirror unit MU. With the above operation, the scanning for one screen has been completed. Then, after the mirror unit MU has made one rotation, when the first mirror surface M1 and second mirror surface M2 of the first pair returns, the scanning is repeated again from the uppermost position on the screen G. Here, in the case where the respective intersection angles of the first to fourth pairs are other than 90 degrees and different from each other, it is preferable that a light emitting timing of a laser light flux at the time of projecting the laser light flux for a pair with an intersection angle apart from 90 degrees is made slower than a light emitting timing of a laser light flux at the time of projecting the laser light flux for a pair with an intersection angle closer to 90 degrees.

In FIG. 17, among a laser light flux projected so as to scan, laser light rays which collide with an object OBJ and are reflected on the object OBJ enter again a point P3 of the second mirror surface M2 of the mirror unit MU, then are reflected on the point P3, proceed along the rotation axis RO, further are reflected on a point P4 of the first mirror surface M1, are collected by the by lens LS, and are detected by the photodiode PD respectively. With the above operation, the object OBJ can be detected in the entire range on the screen G.

Figure 19:
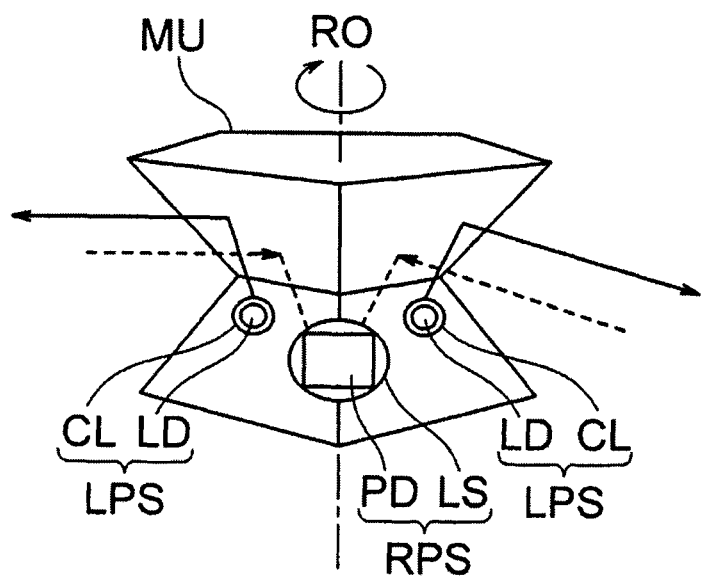
FIG. 19 is an outline drawing showing a laser radar pertaining to a modified example according to a present embodiment.

FIG. 19 is a drawing showing a constitution of a radar pertaining to a modified example according to the present embodiment. In a modified example shown in FIG. 20, in a mirror unit MU shaped in an almost pentagon cylinder, five first mirror surfaces M1 each shaped in a trapezoid are disposed on a lower outer periphery and five second mirror surfaces M2 each shaped in a trapezoid are disposed on an upper outer periphery such that each of the five second mirror surfaces M2 faces a corresponding one of the five first mirror surfaces M1. Further, although a single light receiving system RPS is disposed, two light projecting systems LPS are disposed in parallel to each other in the horizontal direction. In this modified example, in particular, the light receiving system RPS is disposed at a position facing a ridge line of the mirror unit MU so that the light receiving system RPS can receive two laser light beams which are projected respectively from the two light projecting systems LPS and come from two directions. Accordingly, the scanning range can be secured widely. Constitutions other than the above are the same as those in the above-mentioned embodiment.

Figure 28:
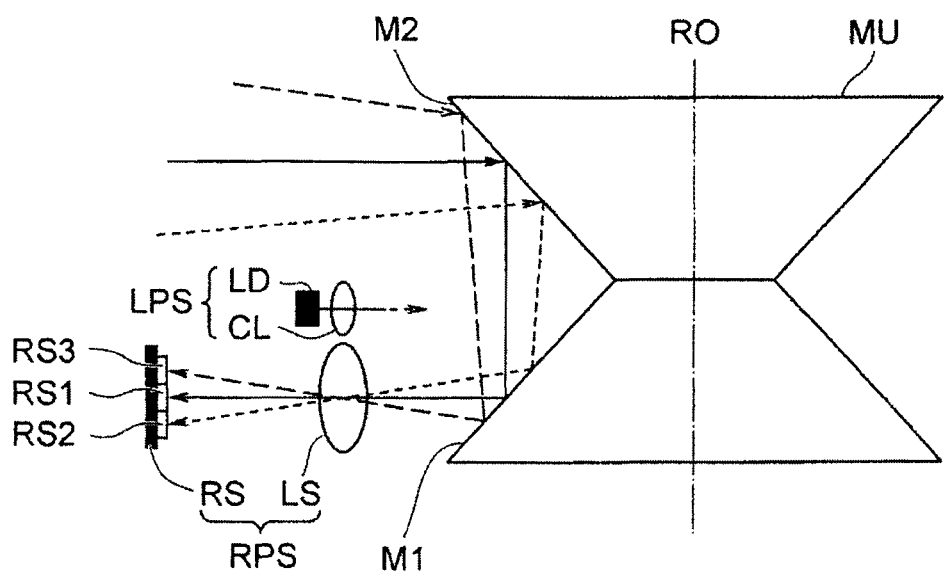
FIG. 28 is a drawing showing a constitution of a radar pertaining to another modified example according to the present embodiment.

FIG. 28 is a drawing showing a constitution of a radar pertaining to another modified example according to the present embodiment. In the modified example shown in FIG. 28, a light receiving system RPS is constituted by a lens LS and a light receiving sensor RS. The light receiving sensor RS is disposed in parallel to the rotation axis RO and is constituted by multiple light receiving elements RS1 to S3 arranged side by side in the longitudinal direction in the drawing. In this way, the light receiving sensor RS includes the light receiving elements RS1 to S3 corresponding to three pixels. Accordingly, a light receiving view field becomes larger. In addition, a main light ray indicated with a solid line in the drawing enters a central light receiving element RS1. Further, a main light ray indicated with a broken line enters a neighboring light receiving element RS2. Similarly, a main light ray indicated with a broken line enters another neighboring light receiving element RS3. Consequently, a view field can be divided in the longitudinal direction (vertical direction) in the drawing, and resolving power can be improved. Constitutions other than the above are the same as those in the above-mentioned embodiment.

Figure 15:
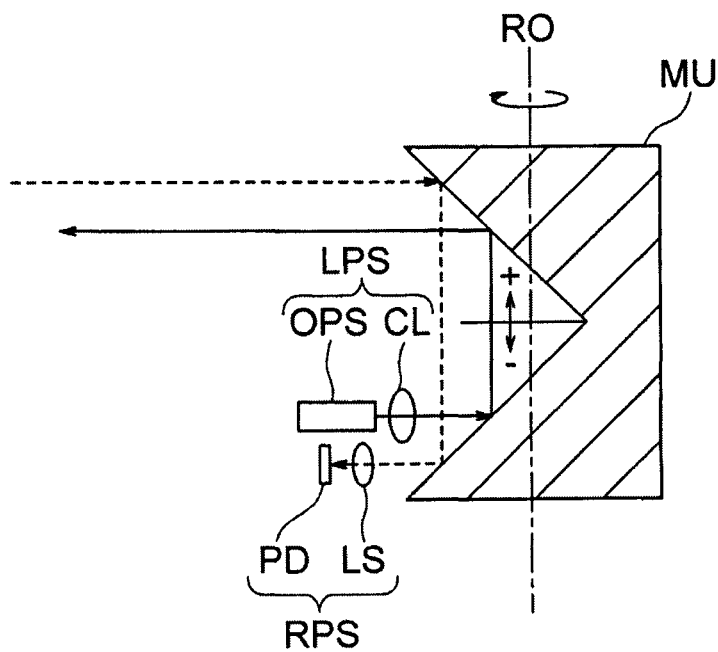
FIG. 15 is a drawing showing a radar according to an example of the present invention.
Figure 20:
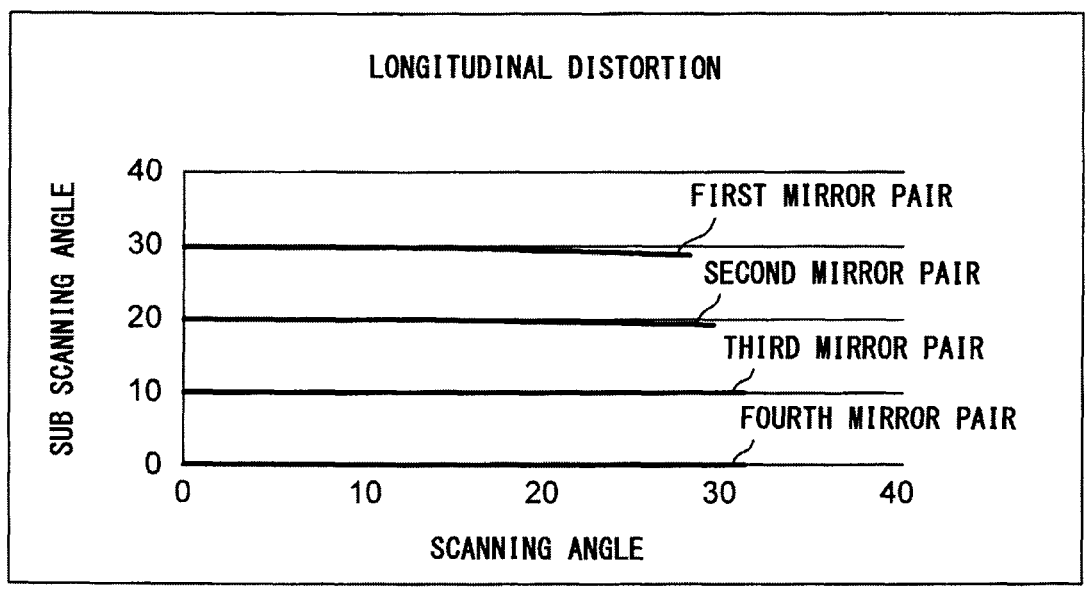
FIG. 20 is a graph showing a relationship between a scanning angle and longitudinal distortion in a radar in Example 1.
Figure 21:
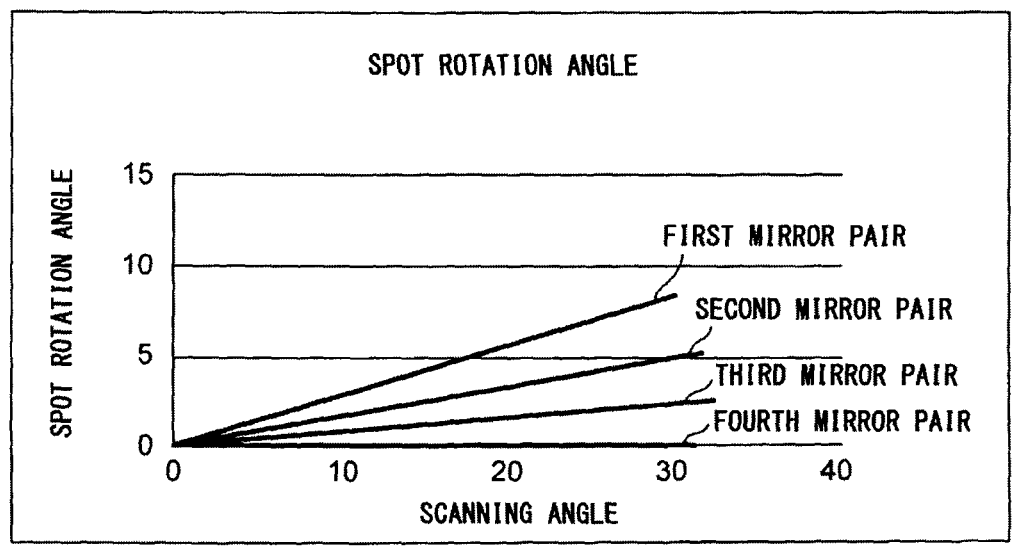
FIG. 21 is a graph showing a relationship between a scanning angle and a spot rotation angle (absolute value) in a radar in Example 1.

Hereinafter, description is given to examples suitable to the above-mentioned embodiment. Herein, since each of a longitudinal distortion and a spot rotation angle is bilaterally symmetrical around the center of a scanning angle made as a criterion, a graph shows only one side of them. In all of the following examples, a light flux emitted from a light projecting system is made longer in a sub scanning angle direction rather than in a scanning angle direction in a measuring range. In Example 1, a radar uses a mirror unit which is made of a resin and includes four pairs of first mirror surfaces and second mirror surfaces (hereafter, called a mirror pair). Accordingly, the number of scanning lines is four. Table 1 shows the specification of the radar in Example 1. Herein, as shown in FIG. 15, with regard to an angle on a mirror surface, an angle on a side which comes closer to the light projecting system relative to a face orthogonal to the rotation axis is indicated with a sign "−", and an angle on a side which goes far from the light projecting system is indicated with a sign "+", (hereafter, the same). FIG. 20 is a graph showing a relationship between a scanning angle and a longitudinal distortion in the radar in Example 1, and FIG. 21 is a graph showing a relationship between a scanning angle and a spot rotation angle (absolute value) in the radar in Example 1. In Example 1, in the case where an intersection angle between a first mirror surface M1 and a second mirror surface M2 is set to $\theta1$ and a rotation angle is set to a, the maximum value is that $|\theta1-90|\times|\alpha|=225$. Further, an incident angle $\beta$ is 0°. It turns out from Example 1 that as the intersection angle becomes larger, a scanning angle becomes small even with the same rotation angle.

TABLE 1

| | | |
|---|---|---|
| THE NUMBER OF SCANNING LINES | | 4 |
| ROTATING ANGLE | | 15 |
| MIRROR SURFACE | | ALUMINUM |
| INCIDENT ANGLE | | 0 DEGREE |
| LIGHT SOURCE | | LED |
| CENTER WAVELENGTH | | 840 NM |

| MIRROR SURFACE ANGLE | FIRST MIRROR PAIR | SECOND MIRROR PAIR | THIRD MIRROR PAIR | FOURTH MIRROR PAIR (°) |
|---|---|---|---|---|
| FIRST MIRROR SURFACE | −45 | −45 | −45 | −45 |
| SECOND MIRROR SURFACE | 60 | 55 | 50 | 45 |
| INTERSECTION ANGLE ($\theta1$) | 105 | 100 | 95 | 90 |

Figure 22:
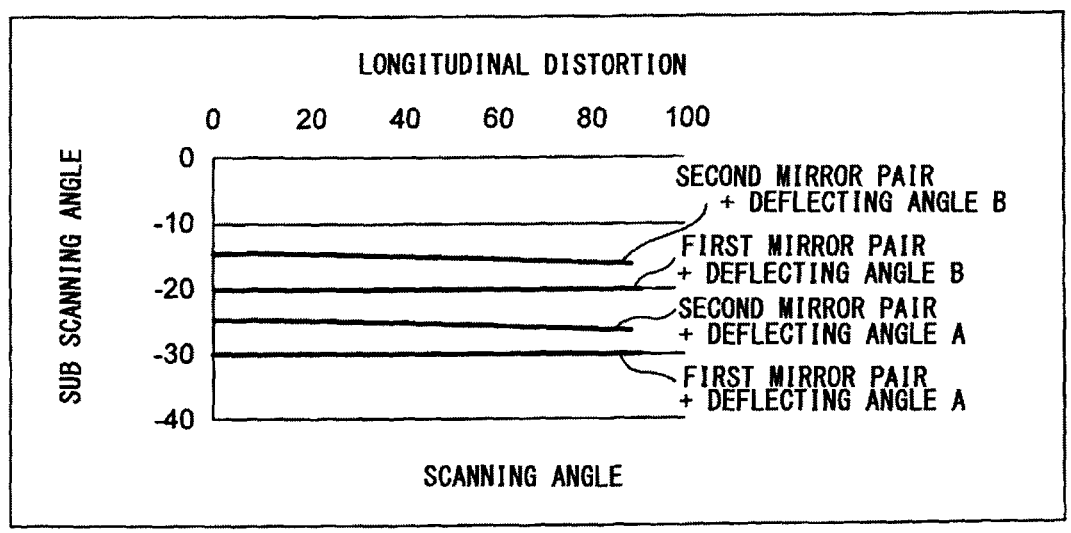
FIG. 22 is a graph showing a relationship between a scanning angle and longitudinal distortion in a radar in Example 2.
Figure 23:
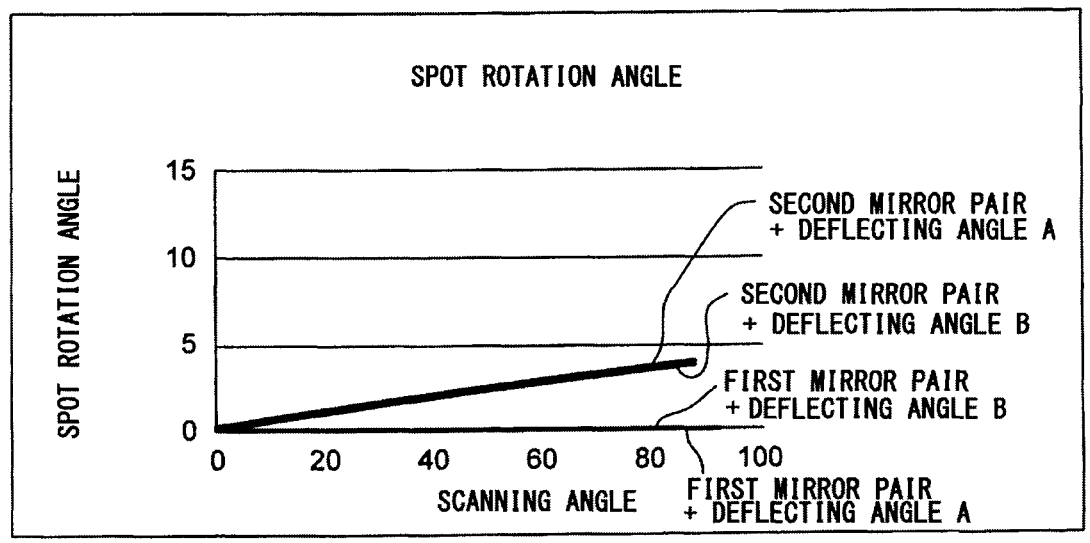
FIG. 23 is a graph showing a relationship between a scanning angle and a spot rotation angle (absolute value) in a radar in Example 2.

In Example 2, a radar uses a mirror unit which is made of a resin and includes two pairs of mirror pairs, a single light projecting system, and a single deflecting element. The deflecting element is a mirror, an incident angle of a light flux emitted from a deflection angle A is −30°, and an incident angle of a light flux emitted from a deflection angle B on another side is −20°. By combining these components, the number of scanning lines becomes four. Table 2 shows the specification of the radar in Example 2. FIG. 22 is a graph showing a relationship between a scanning angle and a longitudinal distortion in the radar in Example 2, and FIG. 23 is a graph showing a relationship between a scanning angle and a spot rotation angle (absolute value) in the radar in Example 2. In Example 2, in the case where an intersection angle between a first mirror surface and a second mirror surface is set to θ1, and a rotation angle is set to a, the maximum value of |θ1−90|×|α| is 112.5. Further, the maximum value of the absolute value of an incident angle β is 30°. In this example, two incident angles are obtained by using the deflecting element. However, by using two light projecting systems, an incident angle of −30° of a light flux emitted from a light projecting system A and an incident angle of −20° of a light flux emitted from another light projecting system B may be used.

TABLE 2

| THE NUMBER OF SCANNING LINES | 4 | |
|---|---|---|
| ROTATION ANGLE | 45 | |
| MIRROR SURFACE | GOLD | |
| INCIDENT ANGLE | −30, −20 | |
| LIGHT SOURCE | SEMICONDUCTOR LASER | |
| CENTER WAVELENGTH | 905 NM | |
| MIRROR SURFACE ANGLE | FIRST MIRROR PAIR | SECOND MIRROR PAIR (°) |
| FIRST MIRROR SURFACE | −60 | −60 |
| SECOND MIRROR SURFACE | 30 | 32.5 |
| INTERSECTION ANGLE (θ1) | 90 | 92.5 |

Figure 24:
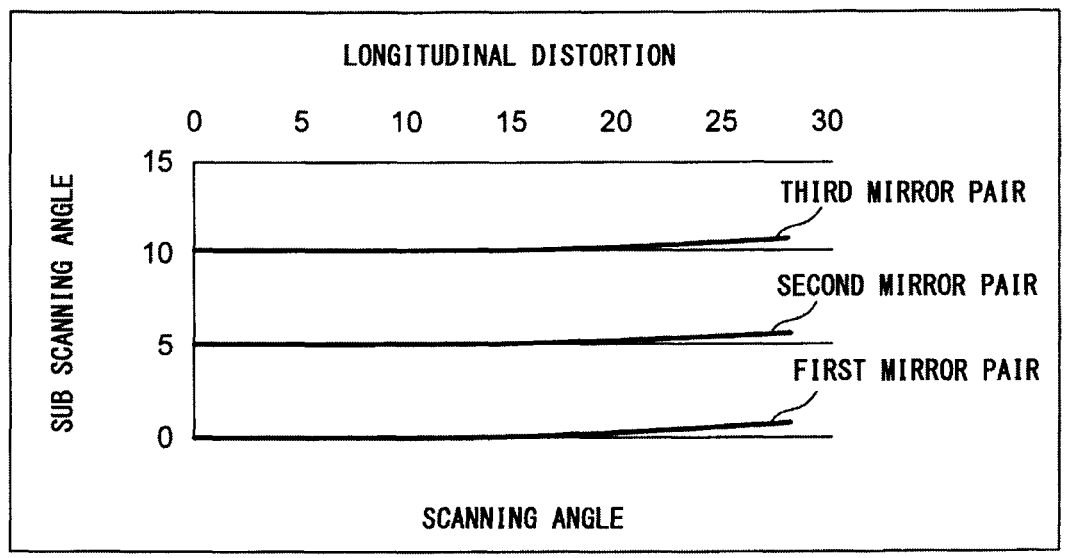
FIG. 24 is a graph showing a relationship between a scanning angle and longitudinal distortion in a radar in Example 3.
Figure 25:
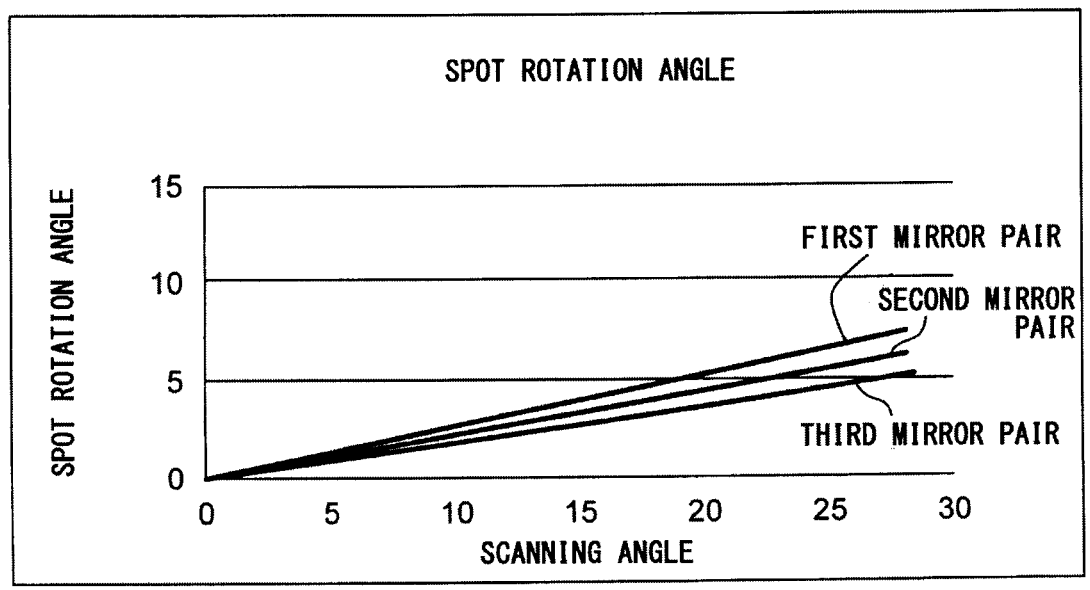
FIG. 25 is a graph showing a relationship between a scanning angle and a spot rotation angle (absolute value) in a radar in Example 3.

In Example 3, a radar uses a mirror unit which is made of a resin and includes three pairs of mirror pairs. Accordingly, the number of scanning lines is three. Table 3 shows the specification of the radar in Example 3. FIG. 24 is a graph showing a relationship between a scanning angle and a longitudinal distortion in the radar in Example 3, and FIG. 25 is a graph showing a relationship between a scanning angle and a spot rotation angle (absolute value) in the radar in Example 3. In Example 3, in the case where an intersection angle between a first mirror surface and a second mirror surface is set to θ1, and a rotation angle is set to a, the maximum value of |θ1−90|×|α| is 225. Further, an incident angle β is 30°.

TABLE 3

| THE NUMBER OF SCANNING LINES | 3 | | |
|---|---|---|---|
| ROTATION ANGLE | 15 | | |
| MIRROR SURFACE | SILVER | | |
| INCIDENT ANGLE | 30 | | |
| LIGHT SOURCE | SEMICONDUCTOR LASER | | |
| CENTER WAVELENGTH | 860 | | |
| MIRROR SURFACE ANGLE | FIRST MIRROR PAIR | SECOND MIRROR PAIR | THIRD MIRROR PAIR (°) |
| FIRST MIRROR SURFACE | −30 | −32.5 | −35 |
| SECOND MIRROR SURFACE | 45 | 45 | 45 |
| INTERSECTION ANGLE (θ1) | 75 | 77.5 | 80 |

Figure 26:
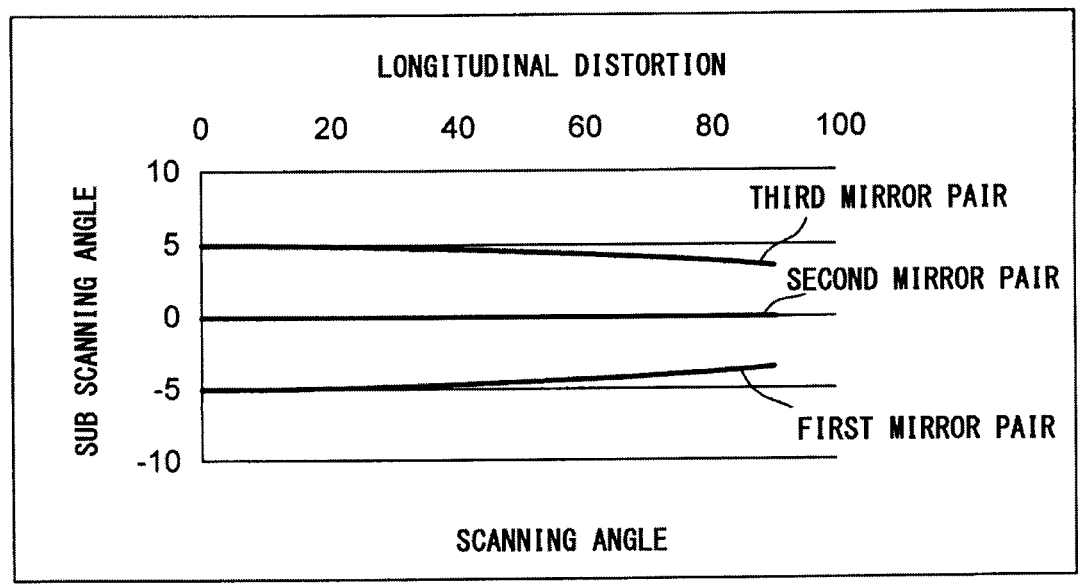
FIG. 26 is a graph showing a relationship between a scanning angle and longitudinal distortion in a radar in Example 4.
Figure 27:
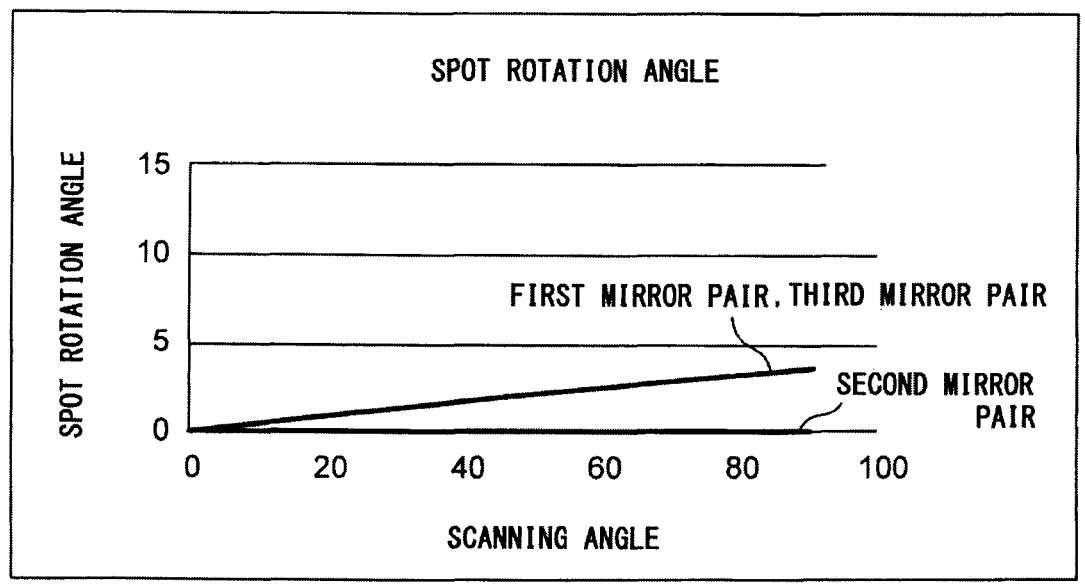
FIG. 27 is a graph showing a relationship between a scanning angle and a spot rotation angle (absolute value) in a radar in Example 4.

In Example 4, a radar uses a mirror unit which is made of a resin and includes three pairs of mirror pairs. Accordingly, the number of scanning lines is three. Table 4 shows the specification of the radar in Example 4. FIG. 26 is a graph showing a relationship between a scanning angle and a longitudinal distortion in the radar in Example 4, and FIG. 27 is a graph showing a relationship between a scanning angle and a spot rotation angle (absolute value) in the radar in Example 4. In Example 4, in the case where an intersection angle between a first mirror surface and a second mirror surface is set to θ1, and a rotation angle is set to α, |θ1−90|×|α|=112.5. Further, an incident angle β is 0°.

TABLE 4

| THE NUMBER OF SCANNING LINES | 3 | | |
|---|---|---|---|
| ROTATION ANGLE | 45 | | |
| MIRROR SURFACE | COPPER | | |
| INCIDENT ANGLE | 0 | | |
| LIGHT SOURCE | SEMICONDUCTOR LASER | | |
| CENTER WAVELENGTH | 860 | | |
| MIRROR SURFACE ANGLE | FIRST MIRROR PAIR | SECOND MIRROR PAIR | THIRD MIRROR PAIR (°) |
| FIRST MIRROR SURFACE | −43.75 | −45 | −46.25 |
| SECOND MIRROR SURFACE | 43.75 | 45 | 46.25 |
| INTERSECTION ANGLE (θ1) | 87.5 | 90 | 92.5 |

Hereinafter, preferable modes are described collectively.

It is preferable that the mirror unit includes multiple pairs of the first mirror surfaces and the second mirror surfaces and the respective intersection angles of the multiple pairs are made different from each other. As mentioned above, the respective intersection angles between the first mirror surface and the second mirror surface in the multiple pairs are made different from each other. Accordingly, the projecting position, in the sub scanning angle direction, of a spot light flux reflected on the first mirror surface and the second mirror surface in the first pair can be changed from the projecting position, in the sub scanning angle direction, of a spot light flux reflected on the first mirror and the second mirror surface in the second pair. With this, even if the length of a spot light flux in the sub scanning angle direction is made small, two dimensional scanning can be performed for a wide measurement range. Further, in the case where a surface normal line is drawn on each of the first mirror surface and the second mirror surface, respective components orthogonal to a rotation axis in the surface normal lines are directed to the same direction. Accordingly, a scanning angle can be made larger than a rotation angle. Furthermore, a rotation angle required for scanning on the first mirror surface and the second mirror surface of one pair can be made smaller than, for example, the type shown in FIG. 1. Accordingly, the number of scanning lines in the sub scanning angle direction can be increased.

Figure 12:
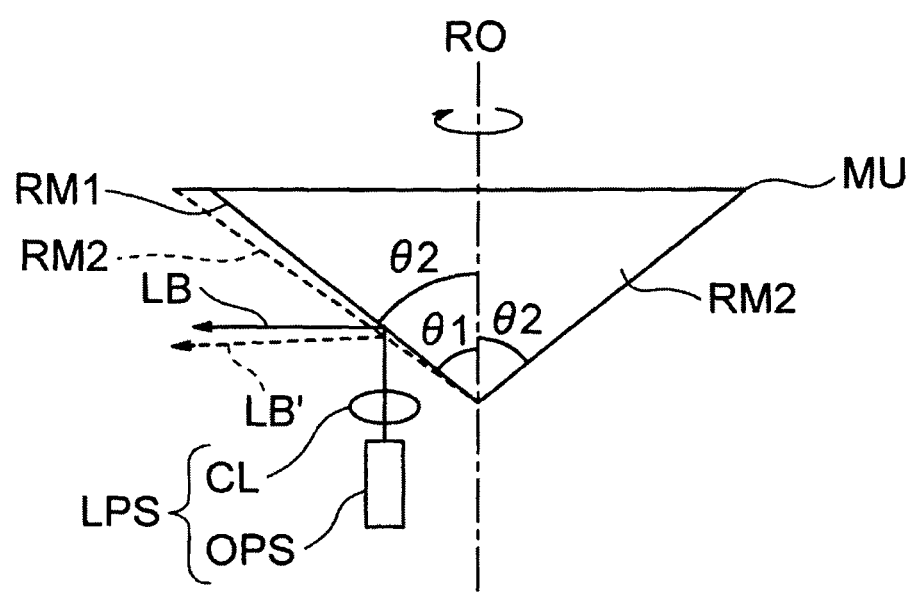
FIG. 12 is a cross sectional view of a radar of a comparative example.

For example, consideration is given to the number of scanning lines which can perform scanning for all an angle of 160 degrees with only a rotating mirror unit. In a mirror unit MU of a scanning optical system shown in FIG. 12 as a comparative example, each of mirror surfaces RM1 and RM2 is extended so as to exist in a direction perpendicular to the surface of FIG. 12 and the mirror surfaces RM1 and RM2 are combined such that the respective back surfaces face each other. The inclination angle θ1 of the mirror-surface RM1 relative to the rotation axis RO is made different from the inclination angle θ2 of the mirror-surface RM2 relative to the rotation axis RO. Here, in the case where a light flux LB is made to enter the mirror unit MU in a direction parallel to the rotation axis RO, the number of scanning lines capable of being changed by only the inclination angles θ1 and θ2 of the mirror surfaces RM1 and RM2 of the mirror unit MU is at most two (a solid line LB and a broken line LB'). In contrast, in the case of using the scanning optical system of the present invention, four pairs of the first mirror surfaces and the second mirror surfaces in which the respective intersection angles are changed or made different from each other, are used, whereby it becomes possible to make the number of scanning lines four. Further, it is also possible to reduce the number of scanning lines and to make a scanning angle wider.

It is preferable to include, between the light source and the mirror unit, a deflecting element configured to change the proceeding direction of a light flux emitted from the above-mentioned light projecting system. As mentioned above, a longitudinal distortion becomes large by shifting an intersection angle between the first mirror surface and the second mirror surface from 90 degrees. However, by deflecting an incident angle β on the first mirror surface in the sub scanning angle direction, it becomes possible to make a light flux scan without shifting the intersection angle largely from 90 degrees. In FIG. 13, a reflecting mirror BE is used as one example of the light deflecting element, and a light flux LB from a light projecting system LPS is reflected on the reflecting mirror BE, reflected on the first mirror surface M1, and then reflected on the second mirror surface M2. The reflecting mirror BE is made rotatable around an axis line PV which is extended so as to exist in a direction perpendicular to the sheet surface of FIG. 13. FIG. 13(c) is a diagram sowing a relationship between a scanning angle and a longitudinal distortion in the case where an incident angle to the first mirror surface M1 is changed by using the reflecting mirror BE on the condition that an intersection angle is 90 degrees. As show in the diagram, in the case where an intersection angle is 90 degrees, no change is caused in a longitudinal distortion.

Figure 13A:
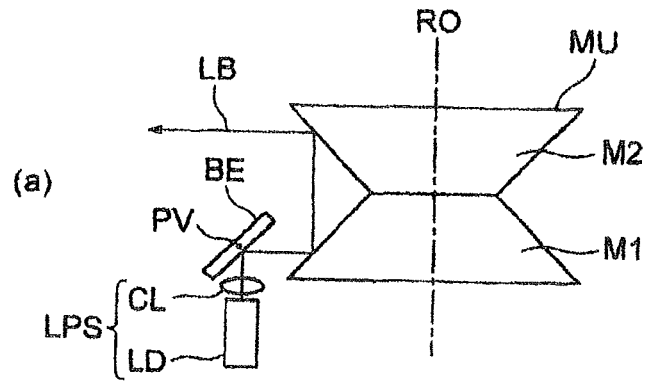
FIG. 13A is a drawing showing a radar according to an example of the present invention where a reflected light flux from a deflecting element is made to enter a mirror unit with an incident angle of 0°.
Figure 13B:
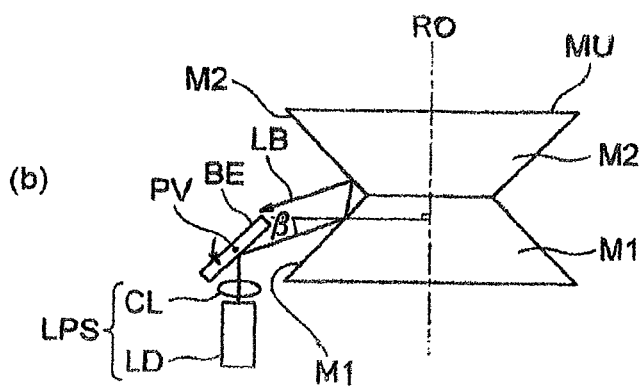
FIG. 13B is a drawing showing a radar according to an example of the present invention where a reflected light flux is made to enter a mirror unit with an incident angle other than 0° by rotating a deflecting element.
Figure 13C:
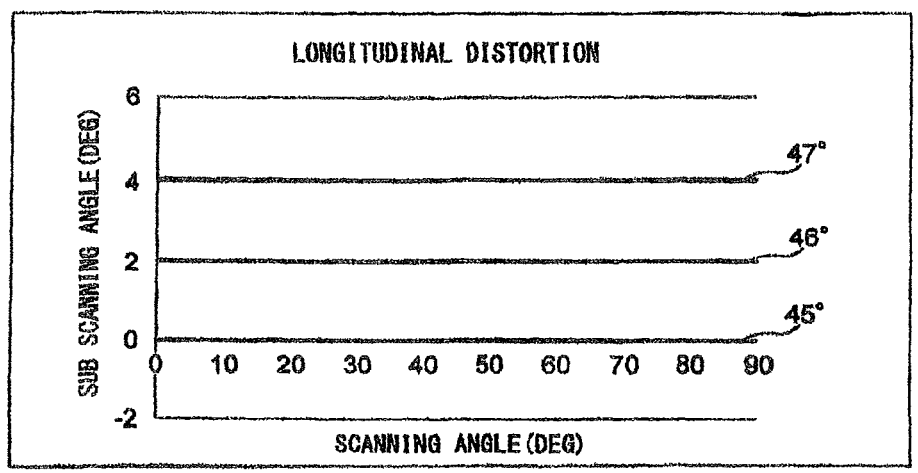
FIG. 13C is a diagram showing a relationship between a scanning angle and longitudinal distortion in the case where, on a state of an intersection angle of 90 degrees, an incident angle to the first mirror surface M1 is changed by using a reflecting mirror BE.

It is clear from the comparison between FIG. 13(a) and FIG. 13(b) that by rotating the reflecting mirror BE around the axis line PV, an incident angle β of a light flux LB reflected from the reflecting mirror BE to the first mirror surface M1 changes (in FIG. 13(a), β=0). With this, the direction of the light flux LB reflected from the first mirror surface M1 changes, and further the direction of the light flux LB reflected from the second mirror surface M2 changes in the sub scanning angle direction. Herein, during a period when the reflecting mirror is being rotated, scanning cannot be performed. Accordingly, for example, in the case where there are three or more pairs of the first mirror surfaces and the second mirror surfaces, after the scanning has been performed with mirror surfaces of the first pair to the third pair, during a period when the mirror surface of the first pair is passing, the reflecting mirror is made to rotate. Then, after the rotation, scanning may be performed for a different sub scanning range with the mirror surfaces of the second pair, the third pair, and the first pair, and the scanning order may be replaced.

Figure 11:
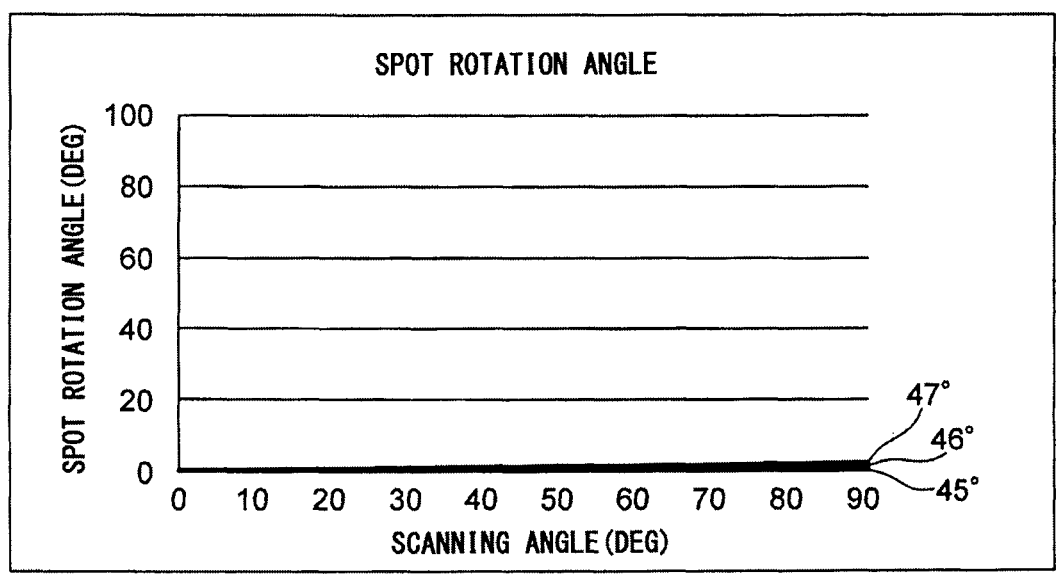
FIG. 11 is a diagram showing a relationship between a scanning angle and a spot rotation angle in a radar according to an example of the present invention.

In the case where a spot light flux is at the center of a scanning angle, a spot light flux can be shifted in the sub scanning angle direction by changing an incident angle to the first mirror surface. However, in the case where an intersection angle between the first mirror surface and the second mirror surface shifts from 90 degrees, as mentioned above, a spot rotation arises as a spot light flux goes to a periphery of the scanning angle (refer to FIG. 11). Therefore, the spot light flux is shifted on an extended line from a position where a spot rotation arises. Accordingly, by using an intersection angle between the first mirror surface and the second mirror surface which can suppress a spot rotation, it become possible to perform scanning by suppressing a change of a measurement range even on a periphery of the scanning angle. Further, a deviation of an incident angle influences a sub scanning angle. Accordingly, when the whole light projecting system inclines, when the main body of a scanning optical system inclines, and when an initial position is corrected, the incident angle may be adjusted by using a deflecting element so as to become a desired value.

It is preferable that the mirror unit includes multiple pairs of the first mirror surfaces and the second mirror surfaces, the respective intersection angles of the multiple pairs are different from each other, a deflecting element to change the proceeding direction of a light flux emitted from the light projecting system is disposed between the light source and the mirror unit, and an angle of the sub scanning angle of the intersection angle between the first mirror surface and the second mirror surface is made to continue.

In addition to increasing of the number of pairs of the first mirror surfaces and the second mirror surfaces and changing of the respective intersection angles, by changing an incident angle to the first mirror surface by using the deflecting element, it becomes possible to increase the number of scanning lines arbitrarily. FIG. 13 shows a case where a mirror unit MU includes multiple pairs of the first mirror surfaces M1 and the second mirror surfaces M2 in which the respective intersection angles are made different from each other. In the case where there are multiple intersection angles in the multiple pairs of the first mirror surfaces and the second mirror surfaces, the angle of each of the multiple intersection angles is apart from others, the angles are made apart from an intersection angle of 90° where a longitudinal distortion does not occur theoretically. Accordingly, a longitudinal distortion may occur. Therefore, in the case where there are multiple intersection angles in the multiple pairs of the first mirror surfaces and the second mirror surfaces, scanning is performed with scanning angles neighboring on each other in terms of angle. Thereby, the respective intersection angles in the multiple pairs of the first mirror surfaces and the second mirror surfaces do not deviate largely from 90 degrees and it becomes possible to increase a sub scanning angle by the deflecting element. The term "continue" means that a deflection angle (an angle difference) by the deflecting element is larger than a deflection angle (an angle difference) in the sub scanning angle direction by the intersection angle between the first mirror surface and the second mirror surface. It does not necessarily need to be scanned in the order of a rotation direction.

It is preferable that the mirror unit is made of a resin. Since the first mirror surface and the second mirror surface are combined, the mirror unit according to the present invention tends to become large in size in the rotation axis direction. Therefore, in many cases, as compared with a mirror and a polygon mirror which are known in a well-known example, weight tends to become heavy. Further, in the case where a center of gravity is located at a position apart from a power source such as a motor, axial deflection tends to occur. If axial deflection occurs, a gap is caused between an angle evaluated by scanning and a sub scanning angle. Accordingly, for example, on the assumption that a side where an object exists is deemed as a forward side, when the rotation axis inclines back and forward, a longitudinal distortion tends to take place as a light flux goes to a periphery of a scanning angle. Then, in the case where the mirror unit is made of a resin so as to become light in weight, the mirror unit can be made not to likely to cause axial deflection. Here, each of the first mirror surface and the second mirror surface can be formed in such a way that, on a mirror unit, a reflecting layer is deposited or coated, a reflecting film is plated, or a metal polish mirror or a film mirror is pasted. Further, in the case where the mirror unit is used under an environment where a temperature changes, if the mirror unit is produced by resin, such as polycarbonate and acrylic, since such resin has a high coefficient of thermal expansion, a change, such as distortion on a surface due to a temperature change may be caused, which results in a possibility that a projected light flux may collapse. Accordingly, in the case where the mirror unit is used under an environment where a temperature changes, the mirror unit may be produced by using a metal such as aluminum with a low coefficient of thermal expansion.

In the case where an intersection angle between the first mirror surface and the second mirror surface of the mirror unit is other than 90 degrees, it is preferable to satisfy the following conditional expression.

$$\beta \leq 30 \quad (2)$$

In the conditional expression, β is an angle (°: referred to as an incident angle) of a light flux entering the first mirror surface relative to a surface orthogonal to the rotation axis.

In the case where an intersection angle between the first mirror surface and the second mirror surface becomes apart from 90 degrees, when scanning is performed on a periphery of a scanning angle, a longitudinal distortion and a spot rotation tend to occur. In the case within the conditional expression (2), an incident angle and a sub scanning angle come close to each other, it is permissible not to separate the intersection angle between the first mirror surface and the second mirror surface from 90 degrees, whereby longitudinal distortion and a spot rotation can be suppressed. Further, in the case where an incident angle is made closer to an angle orthogonal to the rotation axis, if the intersection angle between the first mirror surface and the second mirror surface is the same, a longitudinal distortion and a spot rotation can be suppressed. It is preferable to satisfy the following conditional expression.

$$\beta \leq 20 \quad (2')$$

It is more preferable to satisfy the following conditional expression.

$$\beta \leq 10 \quad (2')$$

It is preferable to include multiple light projecting systems as the above-mentioned light projecting system, and it is preferable that the respective angles of the light fluxes emitted from the multiple light projecting systems relative to a plane orthogonal to the rotation axis at the time of entering the first mirror surface are made different from each other.

Figure 14:
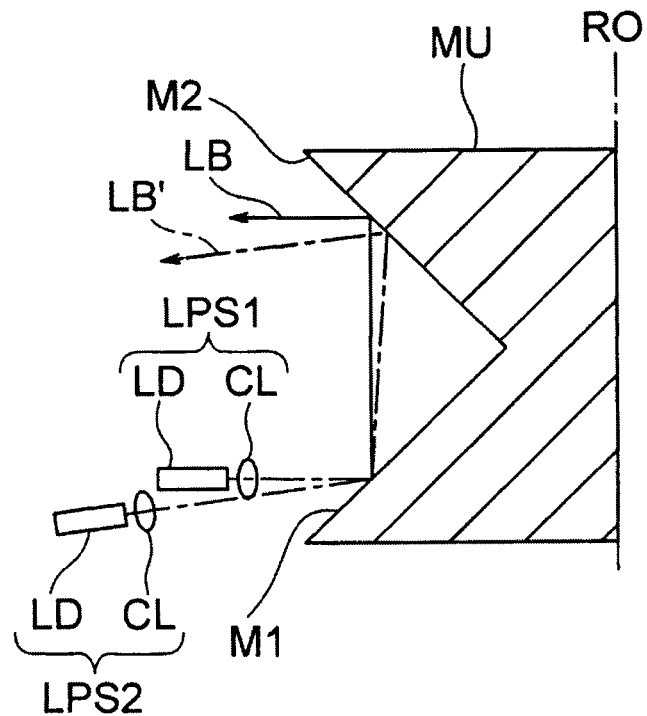
FIG. 14 is a drawing showing a radar according to an example of the present invention, wherein multiple light projecting systems are used.

With the multiple light projecting systems, it is possible to make a scanning angle or a sub scanning angle larger without making a longitudinal distortion and spot rotation deteriorate greatly. For example, as shown in FIG. 14, in the case where light fluxes LB and LB' are made to enter from two light projecting systems LPS1 and LPS2 with the respective different incident angles in the sub scanning angle direction, the respective emitting directions of the light fluxes LB and LB' emitted from the second mirror surface M2 change in the sub scanning direction. With this, it becomes possible to increase the number of scanning lines without making a longitudinal distortion deteriorate. With this operation, while using an intersection angle between the first mirror surface and the second mirror surface set to the vicinity of 90 degrees, it becomes possible to increase a range subjected to the sub scanning.

Further, in the case where multiple light projecting systems (it is preferable that the respective incident angles are equal to each other) are disposed at the respective positions apart from the rotation axis, the influence of the ridge line (an intersecting portion with a mirror surface neighboring in the rotation direction) of the mirror unit is made small. Accordingly, even if the number of pairs of the first mirror surfaces and the second mirror surfaces is increased, the scanning angle can be made wider.

It is preferable to include a light receiving system configured to receive the reflected light rays of a light flux which is made to scan through the mirror unit and is projected to the object. According to the present invention, a light flux can be projected to an object in such a manner that each of a longitudinal distortion and spot rotation is little. Accordingly, a light flux from the light projecting system can be projected or irradiated in an appropriate direction. For this reason, a spot light can be projected so as to scan only on a required range. Therefore, by providing a light receiving system having a view field corresponding to a scanning range, it becomes possible to detect an object only in a required range. For example, a light receiving system constituted by a two dimensional sensor (CMOS, CCD, etc.) and a lens is used.

It is preferable to receive light rays reflected from the object by the light receiving system by reflecting them on the first mirror surface after reflecting them on the second mirror surface. With the above-mentioned light projecting system and the mirror unit, it is also possible to scan a wide range of an entire angle of 180 degrees or more. However, it is difficult to receive the reflected light rays from such a wide scanning range by a two dimensional sensor (CMOS, CCD, etc.) and a lens as the light receiving system, and it is difficult to obtain a necessary object-side aperture diameter. Further, even if light rays are received, since a lens has distortion, resolving power may change. Then, as shown in FIG. 15, the light projecting system LPS is placed closer to the second mirror in the rotation axis RO direction rather than the light receiving system RPS, and the light projecting system LPS and the light receiving system RPS are arranged such that each of their optical axes is orthogonal to the rotation axis and their optical axes are parallel to each other. Light rays reflected from the object are reflected on the second mirror surface M2, further reflected on the first mirror surface M2, and are received by an imaging sensor PD via a lens LS of the light receiving system RPS, whereby it is possible to obtain the same resolving power with that of the light projecting system LPS on a range of, for example, an entire angle of 180 degrees. It is preferable that the respective optical axes of the light receiving system RPS and the light projecting system LPS are parallel to each other. However, light rays may be received through an optical axis shifted by a lens or a free curved-surface mirror. By arranging the optical axis so as to be orthogonal to the rotation axis, it is possible to obtain a scanning angle being bilaterally symmetrical. However, if there is a margin in the scanning angle, the optical axis may be arranged so as to shift rightward or leftward.

It is preferable that the light receiving system includes at least a light receiving sensor constituted by multiple light receiving elements so as to divide a view field in the long side direction of a light flux emitted from the light projecting system. The light flux emitted from the light projecting system is made longer in the sub scanning angle direction rather than in the scanning angle direction within a measurement range of the object, whereby the rotation of a spot can be made small. Accordingly, the view field in the vertical direction can be enlarged with a wide scanning angle. However, corresponding to the enlargement, the resolving power lowers. Then, by arranging multiple light receiving elements at least in the same direction with the long side direction of a light flux emitted from the light projecting system, the view field can be made wider, and in addition, the view field can be divided, whereby the resolving power can be improved. For example, as shown in FIG. 28, by arranging multiple light receiving elements in the rotation axis direction, a field of view can be divided.

The mirror unit includes multiple pairs of the first mirror surfaces and the second mirror surfaces in which an intersection angle in at least one pair is other than 90 degrees. A light emitting timing of the light source at the time of projecting a light flux onto a pair in which an intersection angle is apart from 90 degrees is made slower than a light emitting timing of the light source at the time of projecting a light flux onto a pair in which an intersection angle is closer to 90 degrees (including a case where the an intersection angle is 90 degrees). In the case where an intersection angle become apart from 90 degrees, a rotation angle and a scanning angle are made close to each other. Accordingly, in the case where a light emitting timing for an intersection angle is the same with that for a different intersection angle, there is fear that a space between spot light fluxes becomes narrower or wider. Then, as an intersection angle becomes apart more from 90 degrees, a light emitting timing of the light source for the intersection angle is made slower, whereby it becomes possible to reduce a change in the resolving power.

It is clear for a person skilled in the art from the embodiments, the examples, and the technical concepts described in the present specification that the present invention should not be limited to the embodiments and the examples described in the present specification and includes another example and modified examples. The description and examples in the specification are made for the purpose of at least exemplification, and a range of the scope of the present invention is shown by claims mentioned later. For example, all the contents of the present invention described by using the drawings are applicable to all the embodiments.

REFERENCE SIGNS LIST

1 Vehicles
1a Front window
1b Front grille
CL Collimating lens
G Screen
LD Semiconductor laser
Ln1 to Ln4 Region of a screen
LPS Light projecting system
SO Optical axis of a light projecting system
LR Laser radar
LS Lens
M1 First reflecting surface
M2 Second reflecting surface
OBJ Object
PD Photodiode
MU Mirror unit
RO Rotation axis
RPS Light receiving system

The invention claimed is:

1. A scanning optical system, comprising:
 a rotatable mirror unit including a first mirror surface and a second mirror surface each inclining relative to a rotation axis; and
 a light projecting system including at least one light source which emits a light flux toward an object through the mirror unit;
 wherein a light flux emitted from the light source is reflected on the first mirror surface of the mirror unit, then, proceeds to the second mirror surface, further is reflected on the second mirror surface, and is projected so as to scan on the object correspondingly to rotation of the mirror unit,
 wherein the mirror unit includes multiples pairs of the first mirror surfaces and the second mirror surfaces, and the respective intersection angles of the multiples pairs are different from each other,
 wherein in one rotation of the mirror unit, the light flux emitted from the light source is reflected on the second mirror surfaces in the respective pairs which construct the multiples pairs, and is projected sequentially, thereby to scan a measurement range in which the object is measured, and
 wherein a length in a sub scanning direction of the light flux emitted from the light source and the intersection angles of the multiples pairs are set so as to correspond to a length in a sub scanning direction of the measurement range,
 wherein in the case where an intersection angle between the first mirror surface and the second mirror surface in the mirror unit is other than 90 degrees, the following conditional expression is satisfied, $\beta \leq 30$ in the conditional expression, $\beta$ is an angle (°: referred to as an incident angle) of a light flux entering the first mirror surface relative to a plane orthogonal to the rotation axis.

2. The scanning optical system of claim 1, further comprising a deflecting element which changes a proceeding direction of a light flux emitted from the light projecting system and is disposed between the light source and the mirror unit.

3. The scanning optical system descried in claim 1, further comprising
 a deflecting element which changes a proceeding direction of a light flux emitted from the light projecting system and is disposed between the light source and the mirror unit,
 wherein an angle of a sub scanning angle in an intersection angle between the first mirror surface and the second mirror surface is made to continue.

4. The scanning optical system of claim 1, wherein the mirror unit is made of a resin.

5. The scanning optical system of claim 1, further comprising multiple light projecting systems as the light projecting system, wherein respective light fluxes emitted from the multiple light projecting systems have respective different angles relative to a plane orthogonal to the rotation axis when entering the first mirror surface.

6. The scanning optical system of claim 1, further comprising a light receiving system to receive reflected light rays of a light flux projected so as to scan on the object via the mirror unit.

7. The scanning optical system of claim 6, wherein the reflected light rays from the object are reflected on the second mirror surface, further reflected on the first mirror surface, and then received by the light receiving system.

8. The scanning optical system of claim 6, wherein the light receiving system includes a light receiving sensor constituted by multiple light receiving elements so as to at least divide a view field in a long side direction of a light flux emitted from the light projecting system.

9. A scanning optical system of claim comprising:
a rotatable mirror unit including a first mirror surface and a second mirror surface each inclining relative to a rotation axis; and
a light projecting system including at least one light source which emits a light flux toward an object through the mirror unit;
wherein a light flux emitted from the light source is reflected on the first mirror surface of the mirror unit, then, proceeds to the second mirror surface, further is reflected on the second mirror surface, and is projected so as to scan on the object correspondingly to rotation of the mirror unit,
wherein the mirror unit includes multiples pairs of the first mirror surfaces and the second mirror surfaces, and the respective intersection angles of the multiples pairs are different from each other,
wherein in one rotation of the mirror unit, the light flux emitted from the light source is reflected on the second mirror surfaces in the respective pairs which construct the multiples pairs, and is projected sequentially, thereby to scan a measurement range in which the object is measured, and
wherein a length in a sub scanning direction of the light flux emitted from the light source and the intersection angles of the multiples pairs are set so as to correspond to a length in a sub scanning direction of the measurement range,
wherein the mirror unit includes multiple pairs of the first mirror surfaces and the second mirror surfaces in which an intersection angle in at least one pair is other than 90 degrees, and
wherein a light emitting timing of the light source at the time of projecting a light flux onto a pair in which an intersection angle is apart from 90 degrees is made slower than a light emitting timing of the light source at the time of projecting a light flux onto a pair in which an intersection angle is closer to 90 degrees.

10. A scanning apparatus, comprising:
the scanning optical system of claim 1.

\* \* \* \* \*